United States Patent
Iwata et al.

[11] Patent Number: 6,076,085
[45] Date of Patent: Jun. 13, 2000

[54] ROUTINE EXECUTING METHOD IN DATABASE SYSTEM

[75] Inventors: Morihiro Iwata, Tama; Masashi Tsuchida, Machida; Yukio Nakano, Oyama; Yoshito Kamegi, Yokohama, all of Japan

[73] Assignee: Hitachi, Ltd., Tokyo, Japan

[21] Appl. No.: 09/028,055

[22] Filed: Feb. 23, 1998

[30] Foreign Application Priority Data

Feb. 26, 1997 [JP] Japan .................................. 9-041907

[51] Int. Cl.[7] ...................................................... G06F 17/30
[52] U.S. Cl. ...................... 707/3; 707/4; 707/5; 395/705
[58] Field of Search ........................ 707/3, 4, 5; 395/705

[56] References Cited

U.S. PATENT DOCUMENTS

| | | |
|---|---|---|
| 5,437,032 | 7/1995 | Wolf et al. ................................ 709/103 |
| 5,495,606 | 2/1996 | Borden et al. ............................... 707/3 |
| 5,515,531 | 5/1996 | Fujiwara et al. ............................ 707/3 |
| 5,692,174 | 11/1997 | Bireley et al. .............................. 707/3 |
| 5,765,146 | 6/1998 | Wolf et al. .................................. 707/2 |
| 5,797,000 | 8/1998 | Bhattacharya et al. ...................... 707/2 |
| 5,813,005 | 9/1998 | Tsuchida et al. .......................... 707/10 |
| 5,819,083 | 10/1998 | Chen et al. ............................... 707/10 |

OTHER PUBLICATIONS

ISO/IEC JTC1/SC21/WG3 DBL–MCI–004, ISO Working Draft Database Language SQL, 1996.
"Parallel Database Systems: The Furture of High Performance Database Systems", CACM, vol. 31, No. 6, 1992, D. DeWitt et al.

*Primary Examiner*—Paul R. Lintz
*Assistant Examiner*—Jean Bolte Fleurantin
*Attorney, Agent, or Firm*—Beall Law Offices

[57] ABSTRACT

In a parallel database system having an execution device on a front end side and a plurality of execution devices on a database operation side (hereinafter referred to as the "divided data side"), the front end side analyzes a definition statement of a routine such as a function or a procedure inputted from a user to create routine execution process instructions for executing the routine. Simultaneously, the front end side determines whether or not a database operation statement is contained in the routine, and creates check information indicative of the determination result. The front end side analyzes a query statement inputted from the user to create a first query execution process instruction to be executed on the front end side and a second query execution process instruction to be executed on the divided data side. When the divided data side executes the query in accordance with the second query execution process instruction, a routine containing no database operation statement in the second query statement process instruction is executed on the divided data side.

44 Claims, 16 Drawing Sheets

FIG. 3A

EXAMPLE OF DEFINITION OF FUNCTION
CONTAINING DATABASE OPERATION STATEMENT

```
                31
CREATE FUNCTION f (height INT, weight FLOAT)
  RETURNS INT
  BEGIN
    DECLARE f FLOAT ;
    DECLARE s CHAR (5) ;              301
    DECLARE r INT ;                  302
    SET f = (weight - 30) / height * 7.2 ;
    IF f > 1.0 THEN CALL w (weight,s) ;
              ELSE CALL h (height,s) ;      303
    SELECT id INTO r FROM type_table       EXAMPLE OF DATA BASE
      WHERE type_name = s ;                OPERATION STATEMENT
    RETURN r ;
  END
```

FIG. 3B

EXAMPLE OF DEFINITION OF FUNCTION CONTAINING
NO DATABASE OPERATION STATEMENT

```
CREATE FUNCTION g (height INT, weight FLOAT)
  RETURNS FLOAT
  BEGIN
    DECLARE r FLOAT ;
    SET r = (weight - 30) / height * 7.2 ;
    RETURN r ;
  END
```

EXAMPLE OF DATABASE OPERATION STATEMENT CHECK INFORMATION  104

| FUNCTION IDENTIFIER | DATABASE OPERATION STATEMENT CHECK INFORMATION |
|---|---|
| f | ON |
| g | OFF |
| h | OFF |
| w | OFF |
| ... | ... |

FIG. 6

EXAMPLE OF QUERY CONTAINING FUNCTION
WITH DIVIDED DATA USED AS ARGUMENT

201

```
SELECT * FROM  personal_data_table
  WHERE  weight_data > 50
  AND  f (height_data, weight_data) = personal_type_id ;
```
601

FIG. 7A

QUERY EXECUTION PROCESS INFORMATION

QUERY (SEARCH) EXECUTION PROCESS INSTRUCTION SET (FOR FRONT END SIDE)

| DATA RETRIEVAL EXECUTION PROCESS INSTRUCTION — 702 |
|---|
|   DATA RETRIEVAL EXECUTION INFORMATION |
| COMMON INFORMATION — 703 |

FIG. 7B

QUERY (SEARCH) EXECUTION PROCESS INSTRUCTION SET (FOR DIVIDED DATA SIDE)

| DATA RETRIEVAL EXECUTION PROCESS INSTRUCTION — 704 |
|---|
|   DATA RETRIEVAL EXECUTION INFORMATION |
| FUNCTION CALL INSTRUCTION |
|   FUNCTION CALL INFORMATION |
| CONDITION EVALUATION EXECUTION PROCESS INSTRUCTION |
|   CONDITION EVALUATION EXECUTION INFORMATION |
| COMMON INFORMATION — 705 |

ROUTINE EXECUTING METHOD IN DATABASE SYSTEM

BACKGROUND OF THE INVENTION

The present invention relates generally to a routine executing method in a database system, and more particularly to a routine executing method suitable for parallel processing of queries in a relational database management system.

Conventionally, relational database systems, particularly SQL database systems, have been increasingly applied mainly to data processing for business.

The earlier SQL specifications have been so configured as to instruct a database server to individually execute one by one database operations such as search, update, insert, delete and so on of data.

The current SQL specifications, on the other hand, provide instructions for substitution and control such as IF, WHILE and so on, in addition to the above-mentioned instructions for database operations, and can collectively define a series of processing in the form of a procedure or a function with an appropriate name given thereto. Here, the procedure and the function are collectively referred to as a "routine."

As a draft of standardization for currently standardized SQL3, there is ISO/IEC JTC1/SC21/WG3 DBL-MCI-004, ISO Working Draft Database Language SQL, 1996.

A server for accessing a database in a database management system receives a request issued during the execution of a user application from a client, accesses the database, and returns a result. Also, in a relational database system, data can be readily divided and positioned into a plurality of database processing servers such that the plurality of database processing servers can parallelly access the divided data to improve the performance of the overall relational database system.

A need for such parallel database systems has been becoming higher with an increase in the amount of data. An exemplary parallel database system is described in D. DeWitt, et. al., "Parallel Database Systems: The Future of High Performance Database Systems", CACM, Vol. 35, No. 6, 1992.

A conventional parallel database system comprises a server (hereinafter referred to as the "front end server") which has a function of analyzing and compiling a query from a user application program (hereinafter abbreviated as "UAP") in a client and a function of totalizing the results of executing the query for divided data positioned in a plurality of parallel processing servers to return the totalized results to the client; and a plurality of servers (each of which is hereinafter referred to as the "database operation server"), each of which has a function of accessing a disk drive, which stores data, for performing required operations on the data. In general, the front end server and the database operation servers are interconnected through a high speed interconnection network.

For configuring a parallel data processing scheme, servers may be allocated on a function basis to achieve a pipeline-type parallel structure, other than the above-mentioned one which allocates divided data to a plurality of servers. In this case, execution process instructions are created for each server function, and the parallel processing is realized by executing each execution process in a multi-thread form.

In a parallel database system, as the division of data and respective functions are parallelly executed as mentioned above, communications are performed between associated functions for transmitting and receiving data flows through pipelines and for other processing. Therefore, the parallel database system has a challenge to reduce a load caused by the communications.

Next, description is made on the execution of a procedure in a parallel database system as a prior art technique. A procedure is defined by a CREATE PROCEDURE statement. In SQL3, a user-defined type, referred to as Abstract Data Type (ADT), can be defined, and another procedure may also be defined in a definition statement for the abstract data type.

A definition statement for a procedure is analyzed by the front end server which creates internal type codes (hereinafter referred to as an "execution process instruction") corresponding to a processing method and process. The execution process instruction may be codes interpreted by an interpreter or codes of execution type. The execution process instruction is registered as dictionary information related to the procedure.

For calling a procedure, a CALL statement is provided for calling a SQL statement from an application program written in a high class language such as C language. The CALL statement is analyzed by the front end server which retrieves execution process instructions corresponding to a procedure name and arguments written in the CALL statement from the dictionary information and executes the retrieved execution process instructions.

If processing described in a procedure includes a database operation such as search, update, insert and deletion of data (hereinafter update, insert and delete queries are collectively referred to as the "update-related queries"), execution process instructions for performing the database operation are provided for the front end server as well as for the database operation servers which have data to be operated.

Each of the database operation servers operates divided data allocated thereto in accordance with execution process instructions provided thereto. The front end server in turn executes execution process instructions for totalizing the results of database operations performed by the respective database operation servers.

As an example, if a database is searched for certain data, the respective database operation servers search for the data, transfer retrieved data to the front end server which sequentially receives and uses the data transferred thereto.

If a dedicated database operation server is provided for high load processing such as sorting or the like, execution process instructions are created likewise for this database operation server.

SUMMARY OF THE INVENTION

In the configuration of the parallel database system described above, it is the front end server that analyzes database operation statements for search, update, insert, delete and so on, and totalizes the results from the respective database operation servers. Also, for executing a procedure from a user application, a body of the procedure is executed by the front end server.

If the body of the procedure includes a database operation statement, the front end server executes the body of the procedure, continuously totalizes the results from the respective database operation servers, and performs the execution of the procedure.

More specifically, a procedure execution unit and a database operation statement execution unit are both included in execution process instructions on the same front end server side. However, database operations are actually performed by the respective database operation servers in which divided data is allocated.

Assume herein that, in the parallel database system, when a database operation statement includes execution of a function, a call to the function is performed by a database operation server which has divided data allocated thereto. Consider also that a database operation statement is also included in the body of the function.

In the parallel database system, the execution of a body of a function is common to the execution of a body of a procedure except for a part of functions, so that the same execution unit on the front end side (hereinafter simply called the "front end side") may be used both as an execution unit for function and as an execution unit for procedure. Therefore, in the case assumed above, every time a function is called, communications such as a request for execution and so on will be made between the function calling party (in this case, the execution unit on the database operation side (hereinafter simply called the "divided data side")) and the execution unit for the function (in this case, the front end side). Although depending upon the type of query from the UAP, the number of communications may amount to an immense value since the function is likely to be called on the divided data side the number of times equal to the number of data records stored therein.

It is an object of the present invention to provide techniques for reducing the number of times of communications between the front end side and the database operation side, caused by a routine call in processing related to a query, to achieve a reduction in time required to execute the query.

It is another object of the present invention to provide techniques for reducing the number of times of communications between the front end side and the database operation side, caused by a routine call in processing related to a query, to achieve a reduction in time required to execute the query, even if a routine to be executed is not determined until the processing related to the query is executed.

It is a further object of the present invention to provide techniques for reducing the number of times of communications between the front end side and the database operation side caused by a routine call in processing related to a query, to achieve a reduction in time required to execute the query, even if the processing related to the query includes nested routine calls.

The above and other objects and novel features of the present invention will become apparent from the description of the following specification and the accompanying drawings.

Among embodiments disclosed by the present invention, a summary of a representative one will be briefly described as follows.

Specifically, in a routine executing method in a parallel database system, within routines (functions and procedures) called in query execution process instructions on a divided data side, a routine containing no database operation statement is executed by a routine calling party, i.e., the divided data side. Stated another way, a front end side creates an execution process instruction on the divided data side such that a routine execution unit on the divided data side is selected for the execution of such a routine containing no database operation statement.

Also, in the routine executing method in a parallel database system, the divided data side is provided with an execution unit for executing a routine containing no database operation statement (a query related to search and update) in its body. Upon defining a routine, a check is made to see whether or not the routine contains a database operation statement in its body, and information indicative of the determination result is stored as one piece of information created by analyzing the definition statement.

Next, when a query statement containing a call to a routine is executed on the divided data side, check information indicating whether or not the routine contains a database operation statement is referenced. If the routine does not contain a database operation statement, the routine is executed on the divided data side.

Since a call unit for calling a routine containing no database operation statement in its body and an execution unit for executing the routine are both resident on the divided data side, no communication is incurred by the execution of the routine. For this reason, the number of times of communications between the front end side and the divided data side is significantly reduced, thereby making it possible to reduce the number of times of communications caused by the execution of a routine containing no database operation statement.

If a routine to be executed is not determined for a routine call until the execution time, check information indicating whether or not a database operation statement is contained in a routine is set as one piece of information associated with execution process instructions created as a result of analyzing the body of the routine. With this information, the routine determined upon execution is checked to see whether or not a database operation statement is contained in this routine, so that an execution unit for the routine can be selected in accordance with the check result.

If a routine call is nested in a body of a routine or a procedure to be executed in the execution unit for executing a routine containing no database operation statement on the divided data side, a routine to be called in the nest is also subjected to the check to see whether or not a database operation statement is contained in this routine.

In this case, a call to the routine to be called in the nest is to be performed on the divided data side. However, if the check information indicating whether or not a database operation statement is contained in the body of the routine called in the nest reveals that a database operation statement is contained in the routine, the execution of the routine is passed to the front end side. Conversely, if no database operation statement is contained in the routine, the routine is executed in the execution unit for executing a routine containing no database operation statement on the divided data side.

Since a communication is eliminated between the call to the routine called in the nest and the routine execution unit, the number of times of communications is significantly reduced in the entire execution of the routine including a nested routine call.

Assuming that the number of routines called by a query (containing no database operation statement in its body) executed on the divided data side is n, and the number of data accessed by the query is A, the numbers of times of communications performed between the front end side and the divided data side, when the present invention is applied and when the present invention is not applied, are as shown in the following Table 1.

TABLE 1

| | Query Execution Request (times) | Routine Call (times) | Total (times) |
|---|---|---|---|
| When Present Invention is Not Applied | 1 | n × m | n × m + 1 |
| When Present Invention is Applied | 1 | 1 | 2 |

Further, when a query call or a routine call is contained in a loop, the number of times of communications results in the product of the total number of times in the above list and the number of times the loop is executed. Since the number of data (records) accessed by a query amounts to several millions—several tens of millions in many cases in a large scale database handled in a parallel database system, the routine executing method of the present invention provides tremendous benefits.

As described above, according to the routine executing method in a parallel database system, when a routine called on the divided data side does not contain a database operation statement in its body, the routine is executed in the routine execution unit provided on the divided data side. It is therefore possible to reduce the number of times of communications incurred by a routine call and accordingly achieve a reduction in time required to execute a query.

BRIEF DESCRIPTION OF THE DRAWINGS

FIGS. 3A and 3B show examples of function definition statements;

FIG. 6 shows an example of a query including a function;

FIGS. 7A and 7B show execution process instruction sets for the query exemplified in FIG. 6;

DESCRIPTION OF THE PREFERRED EMBODIMENTS

The present invention will hereinafter be described in connection with an embodiment of a parallel database system to which the present invention is applied.

Figure 1:
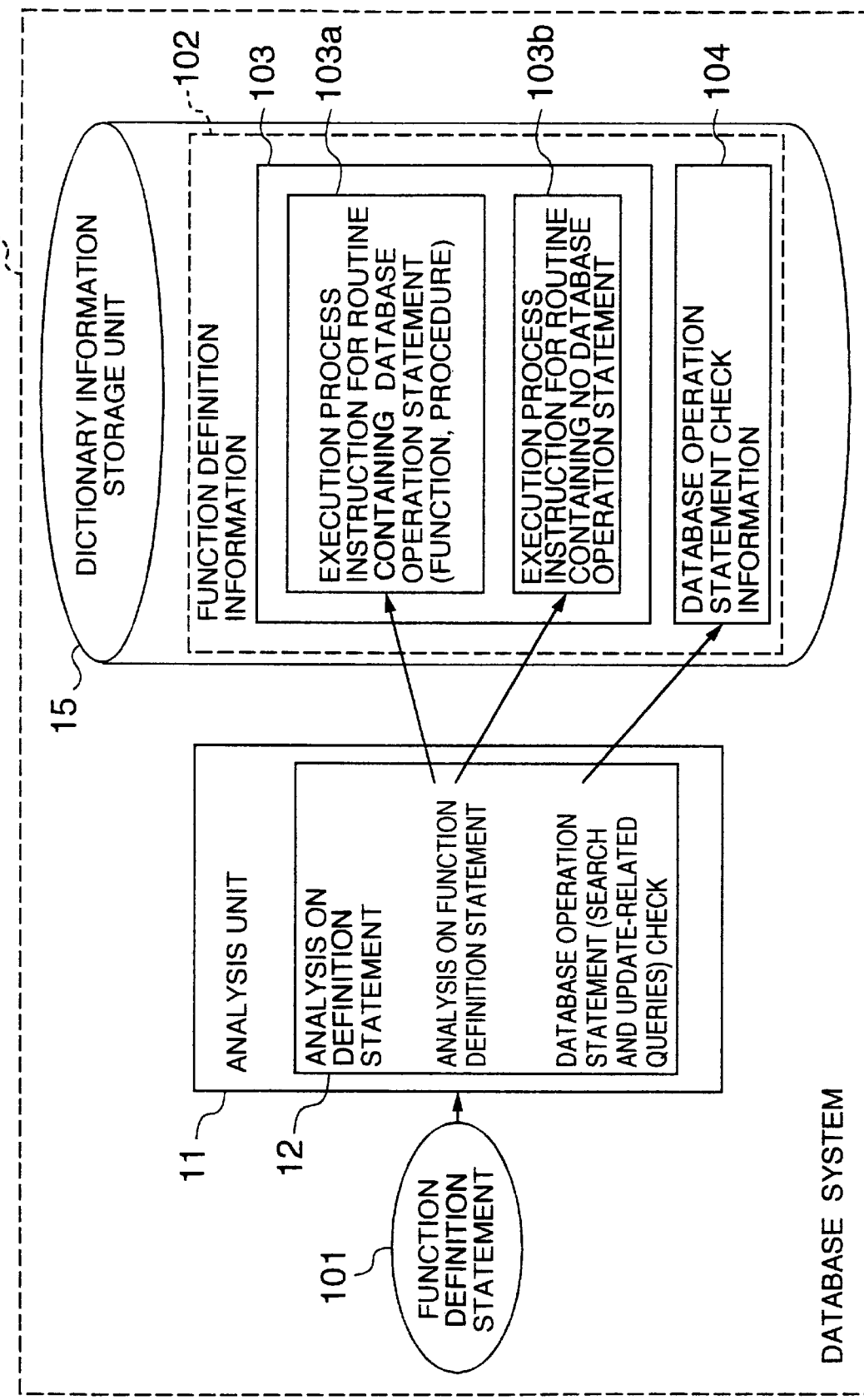
FIG. 1 is a block diagram generally illustrating the concept of an analysis on a function definition statement in a parallel database system which is an embodiment of the present invention.

FIG. 1 generally illustrates a parallel database system 100 which is an embodiment of the present invention. Referring specifically to FIG. 1, the parallel database system 100 comprises an analysis unit 11; a definition statement analysis unit 12; and a dictionary information storage unit 15. Function definition statement 101, function definition information 102, an execution process instruction set 103, and database operation statement check information 104 are also shown in FIG. 1. It should be noted that in the parallel database system 100 of FIG. 1, a single central processing unit (CPU) executes parallel database processing.

The function definition statement 101 inputted by a user is analyzed by the definition statement analysis unit 12 in the analysis unit 11, and the definition statement analysis unit 12 creates the function definition information 102.

During the analysis on the function definition statement performed by the analysis unit 12, it is checked whether or not a database operation statement is contained in a body of a function. The function definition information 102 includes the database operation statement check information 104, which is the result of the check, and is stored in the dictionary information storage unit 15. The function execution process instruction 103 (either 103a or 103b), which is created as a result of the analysis on the body of the function, is also stored in the dictionary information storage unit 15. The function execution process instruction set 103 includes a routine execution process instruction 103a containing at least one database instruction statement, and a routine execution process instruction 103b containing no database operation statement.

If a database operation statement is included in a function as a statement 303 in a function f in FIG. 3A, an intra-function execution process instruction for executing the database operation statement is also included in the function execution process instruction set 103.

While FIG. 1 shows an example of a function definition statement, a procedure definition statement may 20 be similarly analyzed by the configuration of FIG. 1.

Figure 2:
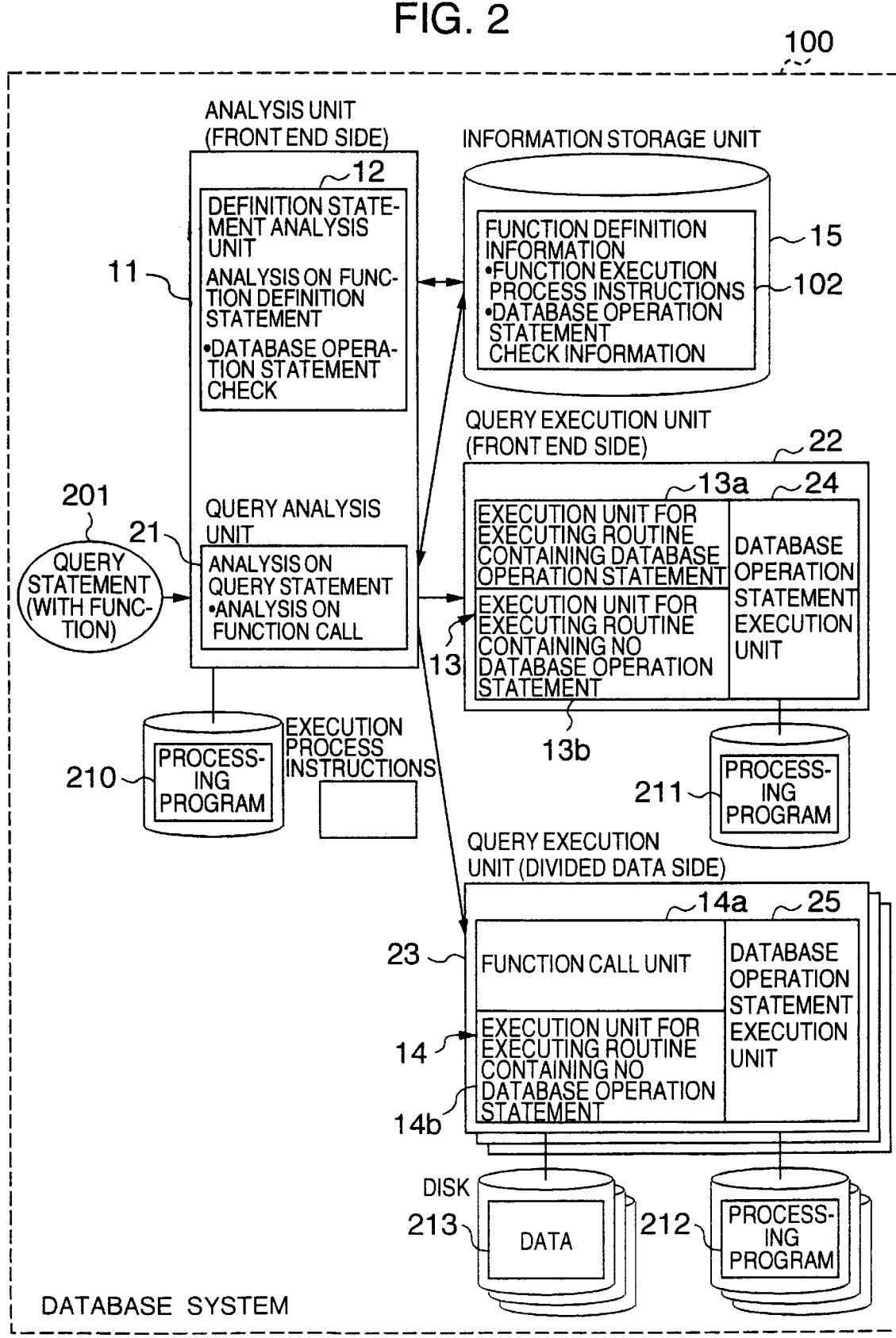
FIG. 2 is a block diagram illustrating the outline of analysis and execution of a query statement in the embodiment of FIG. 1.

FIG. 2 illustrates the parallel database system 100 of FIG. 1, when a query statement 201 including a function is inputted thereto from UAP. Referring specifically to FIG. 2, the database system 100 comprises a query analysis unit 21; a query execution unit 22 on the front end side; query execution units 23 on the divided data side; a database operation statement execution unit 24 on the front end side; and database operation statement execution units 25 on the divided data side. A query 201 and processing programs 210–212 are also shown in FIG. 2. The query execution unit 22 includes a routine execution unit 13 on the front end side, while each query execution unit 23 includes a routine execution unit 14 on the divided data side. As can be seen, a plurality of query execution units 23 are provided on the divided data side.

In the parallel database system 100 illustrated in FIG. 2, the query execution unit 22 serves as a front end which totalizes the results from parallel execution of the query statement 201 by a plurality of the divided data side execution units 23, and returns the totalized results to a user application. Each of the query execution units 23 executes a database operation statement on divided data 213 allocated thereto.

The query analysis unit 21 in the analysis unit 11 analyzes the query statement 201, and creates a query execution process instruction to be executed by the front end side, and a query execution process instruction to be executed by the divided data side.

The query execution unit 22 on the front end side has an execution unit 13a for executing a procedure from a user application and a routine having processing for a database operation statement; an execution unit 13b for executing a routine having no database operation statement; and a database operation statement execution unit 24.

The query execution unit 23 on the divided data side has a database operation statement execution unit 25 for divided data; a function call unit 14a for requesting the front end side to execute a routine containing a database operation statement; and a routine execution unit 14b for a routine containing no database operation statement.

While the parallel database system illustrated in FIGS. 1 and 2 is configured such that the dictionary information storage unit 15 is accessed from the analysis unit 11, the parallel database system routine executing method of this embodiment is also applicable without any problem to a server which comprises a dictionary information provider unit for storage and search of definition information such that dictionary information storage locations are accessed through the dictionary information provider unit.

The routine execution unit 13 on the front end side is used for the execution of a procedure from a user application, the execution of a function and a procedure from function and procedure bodies executed in the routine execution unit 13 on the front end side, and the execution of a function containing a database operation statement performed in response to a function call from the database operation statement execution unit 25 for executing a query on the divided data side, i.e., the execution of a function and a procedure containing a database operation statement requested from the function call unit 14a on the divided data side to execute.

The database operation statement execution unit 24 on the front end side is used for the execution of a database operation statement from a user application, the execution of a database operation statement from the routine execution unit 13 on the front end side, and so on, and serves to totalize the results of executing a database operation statement on the divided data side.

The execution of a function call from the database operation statement execution unit 24 on the front end side is also performed in the routine execution unit 13 on the front end side.

The database operation statement execution unit 25 on the divided data side performs the execution of a database operation statement from a user application, the execution of a database operation statement instructed by the routine execution unit 13 on the front end side, and so on, and serves to perform processing related to search, update and so on for divided data allocated thereto, and return the results of such processing to the database execution unit 24 on the front end side.

The routine execution unit 14b on the divided data side is used for the execution of a function and a procedure, which do not contain a database operation statement, from the database operation statement execution unit 25 on the divided data side.

The routine execution unit 14b on the divided data side provides closed processing within the query execution unit 23 together with the database operation statement execution unit 25. While in FIG. 2, the routine execution unit 146 on the divided data side and the database operation statement execution unit 25 are shown as separate programs, the routine execution unit 14b on the divided data side may be located within the database operation statement execution unit 25.

FIGS. 3A and 3B show examples of the function definition statement 101 in the parallel database system of this embodiment, FIG. 3A shows an example of a definition statement for a function which contains a database operation statement, and FIG. 3B shows an example of a definition statement for a function which does not contain a database operation statement.

In FIG. 3A (also in FIG. 3B), the database language SQL employs a CREATE FUNCTION statement 31 for defining a function. A procedure is defined by a CREATE PROCEDURE statement. In SQL3, for which the standardization is now in progress, a function or a procedure can be defined in a user-defined type definition statement, to which the present invention is applicable without any problem by analyzing a function or a procedure at the time the type is defined.

FIG. 3A shows the definition of a function named "f." A substitution such as a SET statement 301, a construction for control such as an IF statement 302 and a WHILE statement, and a database operation statement such as a SELECT statement 303 can be described in a function body. Queries related to update include an UPDATE statement for update, a DELETE statement for deletion, and an INSERT statement for inserting data. As a similar construction to a query from a user application, it is also possible to define a cursor to perform a search, an update and so on.

FIG. 3B shows the definition of a function named "g." The function a does not contain a database function statement.

Figures 4A, 4B:
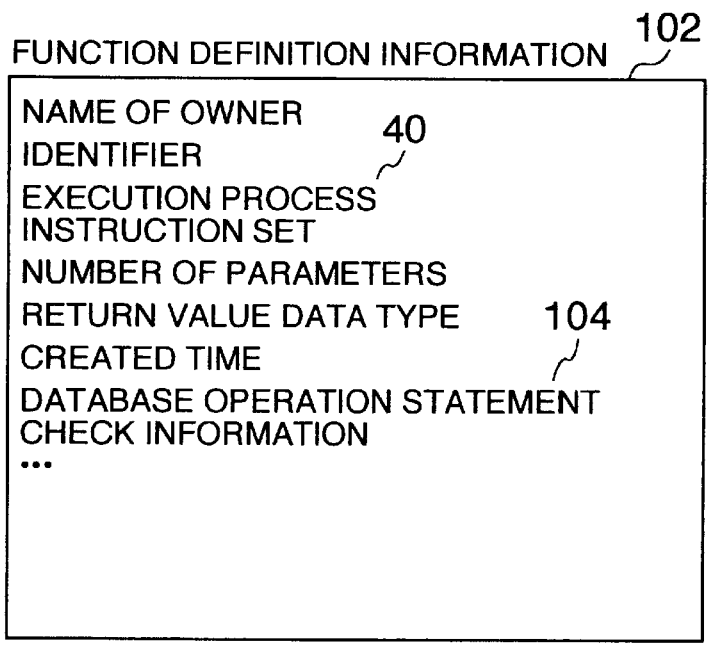
FIGS. 4A and 4B show an example of function definition information and database operation statement check information, respectively.

FIG. 4A shows an example of the function definition information 102 in FIG. 2. The function definition information 102 is information on the result of analysis performed by the definition statement analysis unit 12 for a function defined by CREATE FUNCTION or the like, and generally includes information related to a name, information related to parameters and return values, and so on. Definition information required by the present invention is execution process instruction sets 40 including a function execution process instruction set 103 and query execution process instruction sets 702, 704, and database operation statement check information 104. Further information included in the function definition information 102, if any, is not a particular concern for the present invention. The database operation statement check information 104 may be of any type as long as it is information representing whether or not a database operation statement is contained in the defined function body. For example, the database operation statement check information 104 may be implemented by flag information which is set ON when a database operation statement is contained and OFF when it is not contained, In the example shown in FIG. 3A, since the body of the definition statement for the function f includes the SELECT statement 303 which is a database operation statement, the database operation statement check information 104 is set ON. The database operation statement check information 104 may be included in the function execution process instruction set 103 rather than in the function definition information 102. The function execution process instruction set 103 may not be necessarily located in the function definition information 102 as long as it can be retrieved together with the function definition information. For example, the function definition information 102 may include an identifier for the function execution process instruction set 103, so that the execution process instructions 40 may be stored in any other storage location. The same is applied to definition information for a procedure. A function and a procedure may use definition information of the same type if an additional method is employed to distinguish the procedure from the function using information indicative of the type.

FIG. 4B shows an example of the database operation statement check information 104. As described above, each function is corresponded to the database operation statement check information 104, for example, based on the function definition information 102. In the examples of function definitions shown in FIGS. 3A and 3B, the database operation statement information is set ON for the function f since the function f contains a database operation statement, and set OFF for the function g since the function g does not contain a database operation statement.

Figure 5:
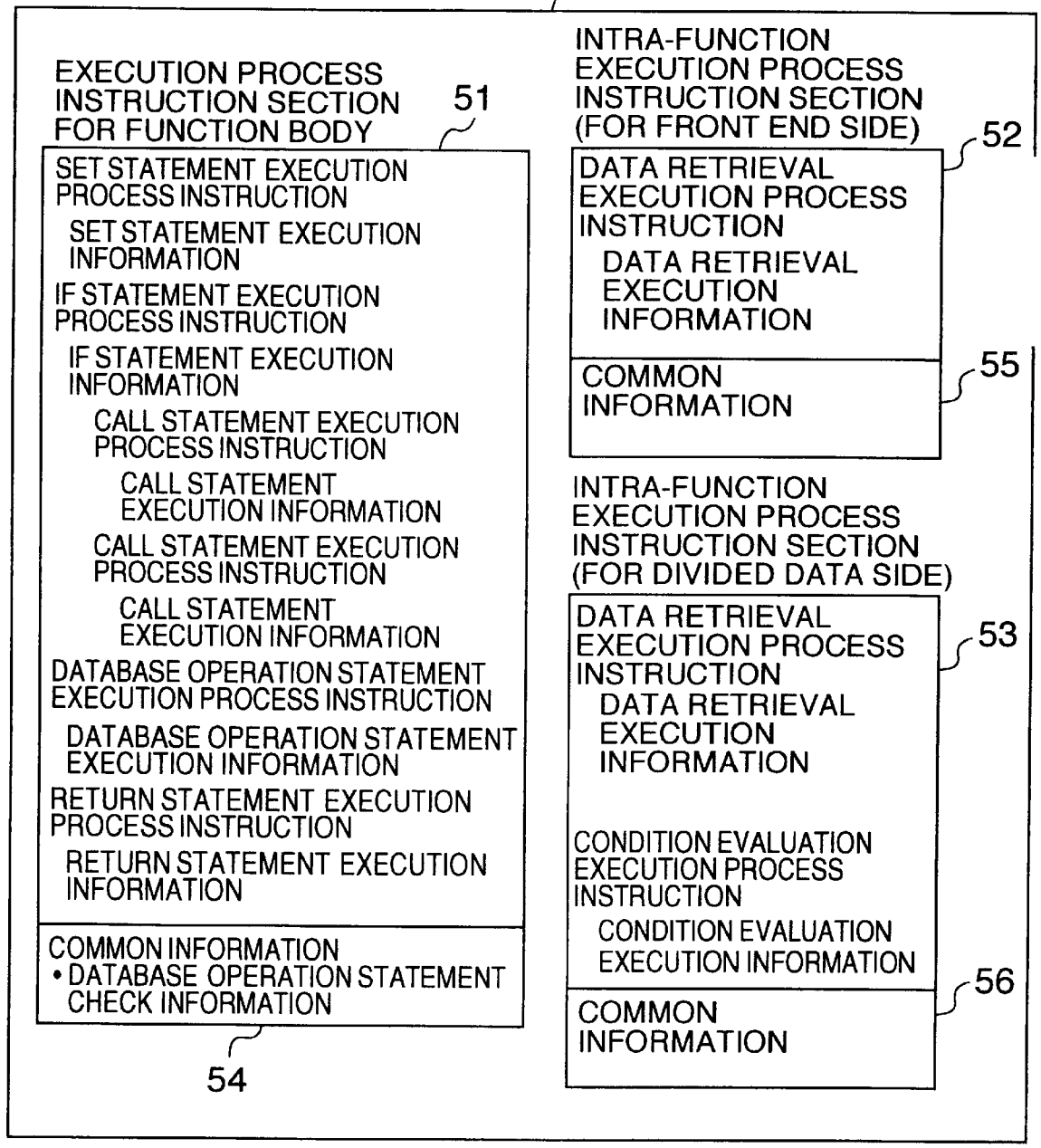
FIG. 5 is a diagram showing an example of an execution process instruction set for the function shown in FIG. 3A.

FIG. 5 is a table showing an example of the function execution process instruction set 103 in the embodiment illustrated in FIG. 2. The function execution process instruction set 103 in FIG. 5 includes an execution process instruction section 51 for the body of the function f shown in FIG. 3A; execution process instruction sections 52, 53 for the search 303 in the function f; and common information 54–56.

As shown in FIG. 5, the function execution process instruction set 103 of this embodiment includes the execution process instruction section 51, created as a result of analyzing the function definition statement 101, which is composed of an execution process instruction for a control construction such as the IF statement 302, WHILE statement and so on, a substitution statement, and so on; an execution process instruction for a call to a procedure; and an execution process instruction for a database operation statement. If a database operation statement is present in a function body, it is necessary to create the intra-function execution process instruction sets 52, 53 corresponding thereto.

While FIG. 5 shows an example in which the instructions and information for executing each construction are interpreted by an interpreter, the function execution process instructions may be in the form of codes of execution type for executing the respective constructions.

When a function call is included in a control construction, a substitution statement or the like, an execution process instruction and information are provided for the function call. An execution process instruction for a procedure or a function called by an execution process instruction for a procedure call or by an execution process instruction for a function call exists separately, and is fetched for execution from definition information or from a cache for definition information in accordance with an associated instruction and information upon calling.

A database operation statement execution process instruction within a function (hereinafter referred to as the "intra-function execution process instruction") is created when the function body contains a search query such as the SELECT statement 303 or the like, and update related queries such as an UPDATE statement, DELETE statement, INSERT statement and so on. Actually, the function execution process instruction set 103 includes the execution process instruction section 53 for execution on the divided data side, and the execution process instruction section 52 for the front end which totalizes the results of execution in the respective execution units on the divided data side.

As execution information for the execution process instruction for each database operation statement, there is information on the intra-function execution process instruction sections 52, 53 for the front end side and the divided data side, respectively, wherein the intra-function execution process instruction sections 52, 53 for the front end side and for the divide data side are fetched from definition information or a cache for definition information and transferred to the corresponding query execution units 22, 23 for execution.

For the respective blocks of execution process instructions such as the execution process instruction section 51 for the function body and the intra-function execution process instruction sections 52, 53, and so on, common information 54–56 are provided as information for common use in their execution and information necessary for the execution of the execution process instructions. The common information 54–56 may not be provided if there is no commonly used information or information necessary for execution.

The database operation statement check information 104 representing whether or not an associated database operation statement is contained in the function or procedure body may be located as the common information 54 in the execution process instruction section 51 for the function body.

In SQL3, for which the standardization is now in progress, an execution process instruction may not be uniquely determined during analysis for a function and procedure call. In this event, since whether a function or a procedure containing a database operation statement in its body is called or not depends on an execution process instruction selected upon execution, the database operation statement check information 104 is located as the common information 54 in the execution process instruction section 51 for function body.

If it is ensured that an execution process instruction is uniquely determined for a function or procedure call during analysis, the execution process instruction may be directly located in the function definition information 102 instead of the common information 54 in the execution process instruction section 51 for function body.

Furthermore, even if an execution process instruction is not uniquely determined during analysis, a list may be created in the function definition information 102 for indicating functions likely to be called upon execution, and the database operation statement check information 104 representing whether or not a database operation statement is contained in each of function and procedure bodies.

FIG. 6 shows an example of the query statement 201 in FIG. 2. In FIG. 6, the query statement 201 with a SELECT statement includes a call 601 to the function f as a WHERE conditions. Depending on the order of evaluation for the conditions, the function f is called the number of times equal to the number of data in a table personal_data_table or the number of times of data satisfying weight_data>50. Since several millions to several tens of millions of data are assumed in a parallel database system, the number of times of function calls can be immense. With a function which ensures that calls with the same argument provide the same result, it may be thought to prevent such calls to the function with the same argument. However, the number of times of function calls is generally large except for special cases.

In the example shown in FIG. 6, the query statement 201 is a database operation statement including a function. The present invention is applied to a function call in this database operation statement. Even if a query statement is a call to a procedure, provided that the body of the procedure contains a database operation statement including a function, the present invention is applicable to a call to that function. In this event, the database operation statement including the function call is analyzed when the procedure is analyzed.

Also, for a call to a function or a procedure which is located within a body of a procedure but outside of a database operation statement, the call and the routine execution unit 13 are present on the same front end side. Therefore, a communication is not inherently incurred by each call irrespective of whether or not a database operation statement is contained. Further, when a query statement is a call to a procedure which does not include a call to a function, the call to the procedure itself and the routine execution unit 13 are present on the same front end side, so that a communication is not inherently incurred by each call irrespective of whether a database operation statement is contained.

FIGS. 7A and 7B are examples of query execution process instruction sets corresponding to the query 201 of FIG. 6. The query execution process instruction sets are created as a result of analyzing the query statement. Query execution process instructions are created corresponding to a search query such as a SELECT statement or the like, and an update-related query such as an UPDATE statement, DELETE statement, INSERT statement or the like. FIG. 7A shows an execution process instruction set 702 for the front end which totalizes the results of execution of the query 201 on respective divided data, while FIG. 7B shows an execution process instruction set 704 for the execution of the query 201 on divided data. These instruction sets 702, 704 are transferred to the corresponding execution units 22, 23 for execution. For each block including execution process instructions such as the execution process instruction sets 702, 704 (for search in the case of the query 201 of FIG. 6), common information 703, 705 are provided as information for common use in their execution and information necessary to execute the execution process instructions. The common information 703, 705 may not be provided if there is no commonly used information or information necessary for execution.

Figure 8A:
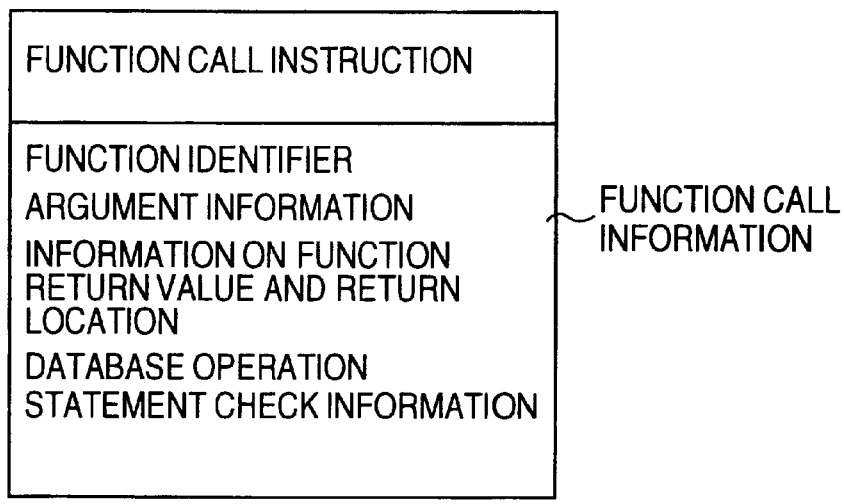
FIGS. 8A and 8B show examples of call execution instructions for a function included in the query exemplified in FIG. 6.
Figure 8B:
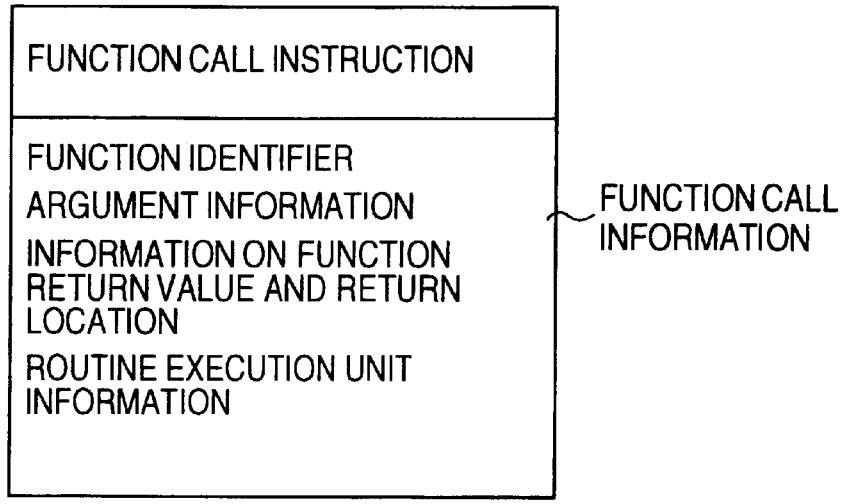

FIGS. 8A and 8B show examples of function call instructions and function call information for the search execution process instruction set (for divided data) 704. As information for a function call, an identifier for a called function is required. Since an execution process instruction set 103 for the function itself exists separately from the search execution process instruction set 704 containing the function call instruction, they must be in correspondence with each other. Also necessary is information on an argument required for the call. The argument may be data retrieved by a data retrieval execution process instruction in the search execution process instruction set (for the divided data) 704 in FIG. 7B, constant data, or a result of processing such data with four arithmetic operations or a variety of other operations. A result of a function may again serve as an argument for another function call. As information on argument, locations (addresses or the like) for storing retrieved data and results of a variety of operations are required.

In addition, for applying the present invention, a routine execution unit for executing a function must be known upon execution. When a routine execution unit is determined using the database operation statement check information during analysis, a routine execution unit is determined with an identifier of the routine execution unit or the like used as function call information. If a routine execution unit is determined upon execution from the database operation statement check information, the database operation statement check information may be placed in the function call information. In the alternative, a routine execution unit may be determined by placing database operation statement check information in common information for function execution process instructions, and acquiring database operation statement check information from a function execution process instruction corresponding to a function identifier. The present invention is also applicable to this method.

Also, when an instruction execution process instruction is executed by a determined routine execution unit, information is required to identify a location for storing a return value (an identifier of an execution unit for a search execution process instruction, an address or the like), which is the result of the execution. In subsequent processing using the result of executing the function, a process instruction may be created to reference the stored location.

FIG. 7B shows an example where a function to be executed is uniquely determined for each function call. However, if a function to be executed is not uniquely determined during analysis, similar information may be provided for each function. If a function to be executed is not uniquely determined during analysis, information for uniquely determining a function to be executed upon execution may be contained in function call information. If a function to be executed is uniquely determined upon execution, the present invention is applicable to this function without any problem.

In FIG. 2, the query execution unit 22 on the front end side and each of the query execution units 23 on the divided data side execute respective query execution process instructions created by the query analysis unit 21 based on the query statement 201.

Particularly, in each of the query execution units 23 on the divided data side, with reference to the database operation statement check information 104, the database operation statement execution unit 25 activates the routine call unit 14a to force the routine execution unit 13a for executing a routine including the processing for a database operation statement on the front end side to proceed with the execution of a routine containing a database operation statement. As to the execution of a routine containing no database operation statement, the database operation statement execution unit 35 forces the routine execution unit 14b for executing a routine including no processing for database operation statement to proceed with the routine containing no database operation statement.

The routine execution unit 14b for executing a routine including no processing for a database operation statement, upon executing the first routine, first acquires the function execution process instruction 103b and other information in a cache for example from the function definition information 102 in the dictionary information storage unit 15 before executing the routine. Therefore, in the second and subsequent execution of the routine containing no database operation statement in its body, no communication is incurred by the function call, thereby making it possible to reduce the number of times of communications between the front end side and the divided data side.

While in the example of FIG. 2, the execution of a function and a procedure is grouped into a single routine execution unit, a function execution unit and a procedure execution unit may be separately provided. Also, if the present invention is applied only to a function, the procedure execution unit may be eliminated. Further, if an extension is added such that a procedure can be described in a database operation statement, the present invention may be applied only to a procedure, and the function execution unit may be eliminated.

Figure 9:
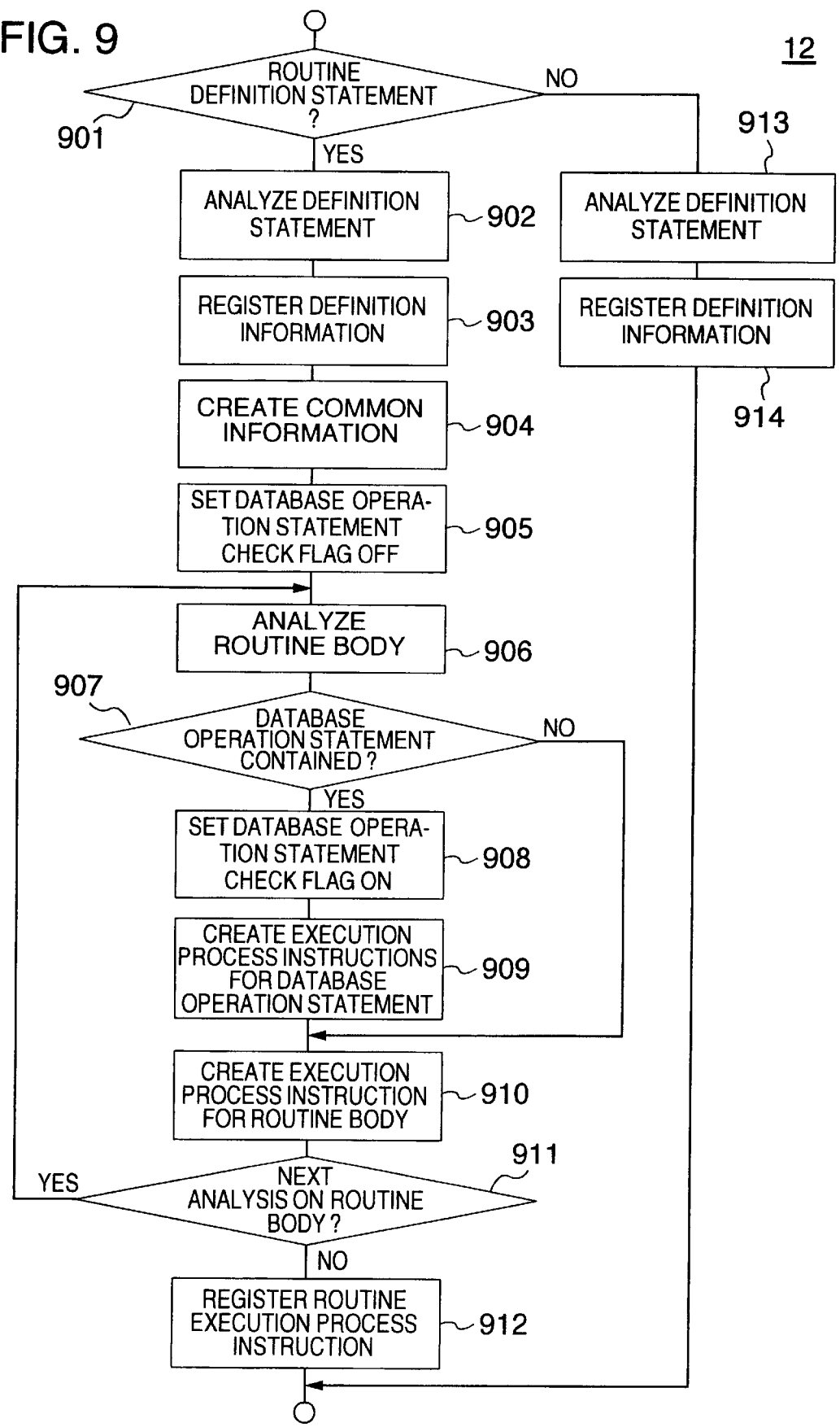
FIG. 9 is a flow chart illustrating a processing flow for a definition statement analysis unit 12 shown in FIGS. 1 and 2.

FIG. 9 is a flow chart illustrating a processing flow for the definition statement analysis unit 12 in accordance with this embodiment.

As illustrated in FIG. 9, the definition statement analysis unit 12 first determines whether or not a definition statement to be analyzed is a definition statement for a routine (step 901). If it is not a definition statement for a routine, the definition statement analysis unit 12 analyzes this definition statement (step 913), and registers the analysis result in the dictionary information storage unit 15 as definition information (step 914).

If the definition statement is a definition statement for a routine, the definition statement analysis unit 12 also analyzes this definition statement for a routine (step 902), and registers the analysis result in the dictionary information storage unit 15 as definition information in the same manner (step 903). However, with a definition statement for a routine, the body of the routine must be analyzed to create an execution process instruction.

Then, the definition statement analysis unit 12 creates common information 54 as information commonly used during the execution of the routine and information necessary to execute the execution process instruction (step 904). As an initial value for a database operation statement check flag, OFF is set to the common information 54 (step 905). In other words, this flag indicates that no database operation statement has been found in the body.

Then, the definition statement analysis unit 12 sequentially analyzes the body of the routine (step 906), and sets the database operation statement check flag to ON (step 908) if the body contains a database operation statement (step 907). The definition statement analysis unit 12 next creates execution process instructions for the database operation statement (for the front end side and for the divided data side) (step 909), transfers these execution process instructions for the database operation statement to the respective sides, and creates an execution process instruction for activation (for the body) (step 910).

If no database operation statement is contained in the body, the definition statement analysis unit 12 creates a corresponding execution process instruction (for the body) (step 910). Subsequently, the definition statement analysis unit 12 analyzes the routine body in sequence (step 911).

When the execution process instructions have been thoroughly created for the entire routine body, the definition statement analysis unit 12 registers the created routine execution process instructions (for the body, and for the front end side and divided data side associated with each database operation statement) in the dictionary information storage unit 15 and so on (step 912).

In the example of FIG. 9, the routine execution process instructions are created when a definition statement for a routine is analyzed. In the alternative, however, the routine execution process instructions may be created when a query using the routine is analyzed. In the latter case, when a routine execution process instruction is created during analysis of the routine, a check is made to see whether or not a database operation statement is contained in the routine, and information indicative of this is set for the routine execution process instruction. In this way, this alternative is applicable without any problem.

In the example illustrated in FIG. 9, the database operation statement check information 104 is set in the common information 54 in the execution process instruction section 51 for function body. In the alternative, the database operation statement check information 104 may be directly set as definition information which may be used when a query is analyzed.

The database operation statement check information 104 may be of any form, instead of flag information to be set ON or OFF, as long as it provides identification as to whether or not a database definition statement is contained in a routine body.

Figure 10:
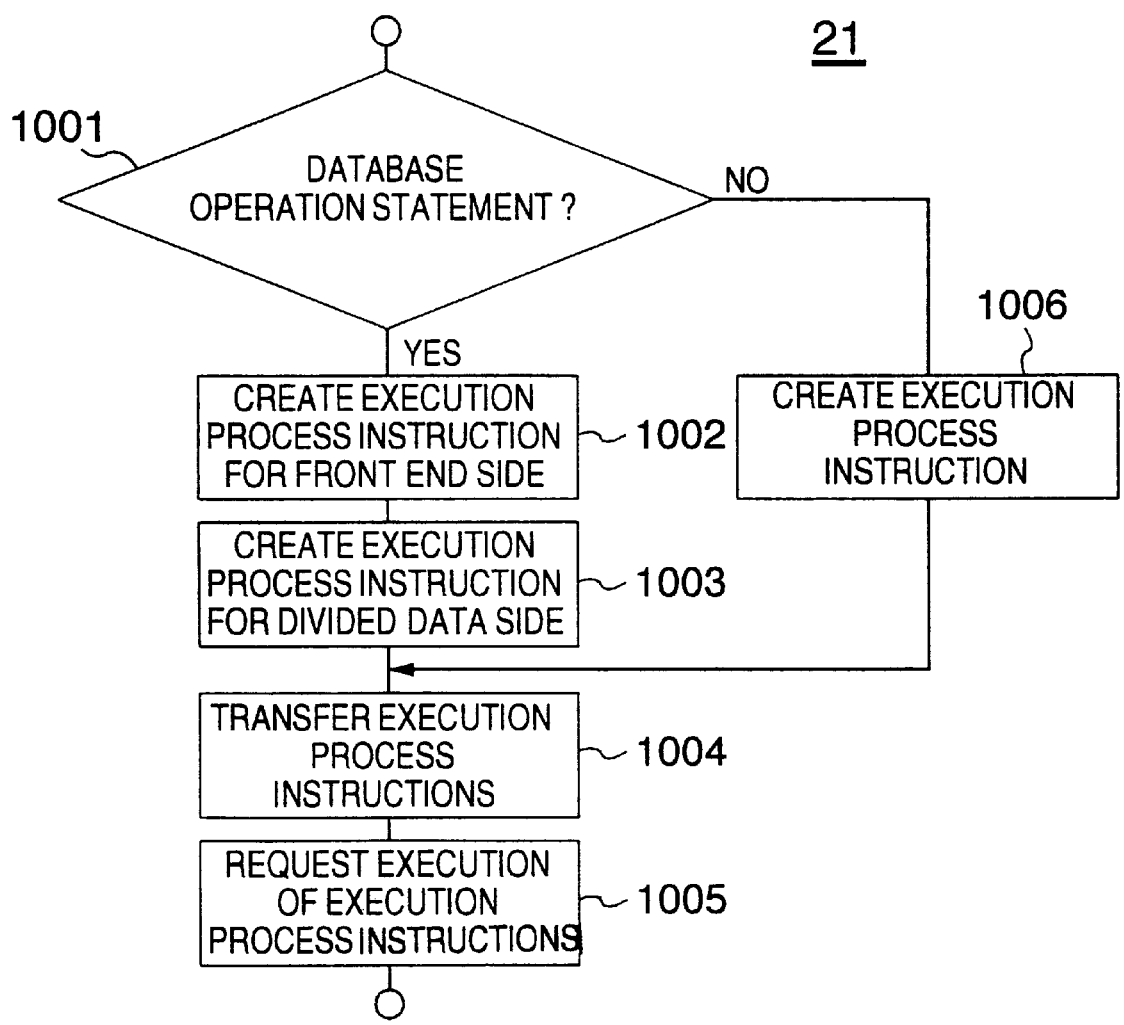
FIG. 10 is a flow chart illustrating a processing flow for a query analysis unit 21 shown in FIG. 2.

FIG. 10 is a flow chart illustrating a processing flow for the query analysis unit 21 in accordance with this embodiment.

As illustrated in FIG. 10, the query analysis unit 21 first determines whether or not a query to be analyzed is a database operation statement (step 1001). If the query is not a database operation statement, the query analysis unit 21 creates a corresponding execution process instruction (step 1006).

While execution process instructions are also created in the same manner when the query is a database operation statement, an execution process instruction for the front end and an execution process instruction for the divided data are created (steps 1002, 1003) when the query is a database operation statement.

In the alternative, an execution process instruction for a special purpose such as sort may be separately created, in which case the method of this embodiment can also be applied. When a function call is performed in an execution unit for a special purpose, the method of this embodiment can be similarly applied by providing this execution unit with the routine execution unit 14b for executing a routine including no processing for a database operation statement.

The created execution process instructions are transferred to the execution units associated with the respective execution process instructions (the database operation statement execution unit 24 on the front end side and the database operation statement execution units 25 on the divided data side) (step 1004), and a request for execution is issued to the respective execution units (step 1005).

FIG. 10 illustrates an example in which the query analysis unit 21 analyzes a query to create execution process instructions, transfers the execution process instructions, and immediately issues a request for execution. Additionally, the parallel database system routine executing method of this embodiment is applicable, without any problem, to an alternative in which execution process instructions are once created, and the transfer and request for execution are separately performed.

In the example illustrated in FIG. 10, even if the query statement 201 has a function call, the query analysis unit 21 does not reference the database operation statement check information 104 to check whether or not the body of the function contains a database operation statement. This is because the example of FIG. 10 is provided on the assumption that a function to be called is not uniquely determined during analysis.

When a function to be called is uniquely determined during analysis, the query analysis unit 21 may reference the database operation statement information 104. If it is OFF, the query analysis unit 21 may create an execution process instruction (on the divided data side) for executing the function in the routine execution unit 14b for executing a routine including no processing for a database operation statement.

Figure 11:
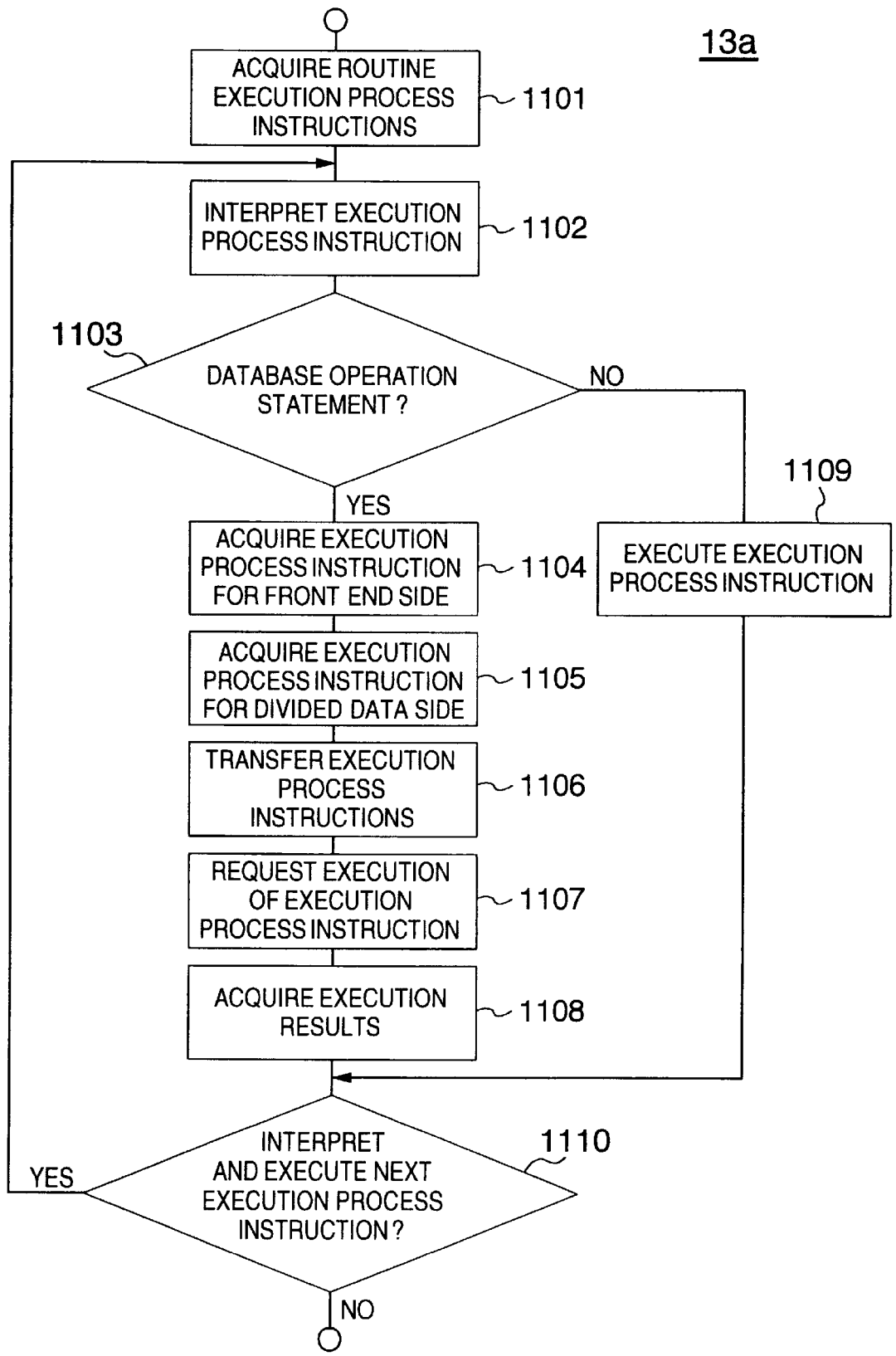
FIG. 11 is a flow chart illustrating a processing flow for a routine execution unit 13a for executing a routine containing a database operation statement shown in FIG. 2.

FIG. 11 is a flow chart illustrating a processing flow for the routine execution unit 13a for executing a routine containing a database operation statement in accordance with this embodiment.

As illustrated in FIG. 11, the routine execution unit 13a for executing a routine containing a database operation statement acquires execution process instructions for a routine to be executed in response to a request for execution of the routine (step 1101). The routine execution process instructions are stored in the dictionary information storage unit 15 or can be acquired based on associated information in the dictionary information storage unit 15. If the routine execution unit 13a is provided with a cache for storing the routine execution process instructions, the routine execution unit 13a need not access the dictionary information storage unit 15 upon the second and subsequent routine calls.

Next, the routine execution unit 13a sequentially interprets the routine execution process instructions (step 1102), and executes the same. When a database operation statement is executed (step 1103), the routine execution unit 13a acquires execution process instructions (for the front end side and for the divided data side) (steps 1104, 1105), transfers the respective execution process instructions to the corresponding execution units (the database operation statement execution unit 24 on the front end side and the database operation statement execution units 25 for the divided data side) (step 1106), and issues a request for execution (step 1107). Then, the respective execution units execute the associated execution process instructions, and the routine execution unit 13a acquires the results (step 1108) for use in later processing and so on.

If a database operation statement is not executed (step 1103), the routine execution unit 13a proceeds with the execution in accordance with corresponding execution process instructions (step 1109). Subsequently, the routine execution unit 13a interprets and executes the execution process instruction in sequence (step 1110).

Figure 12:
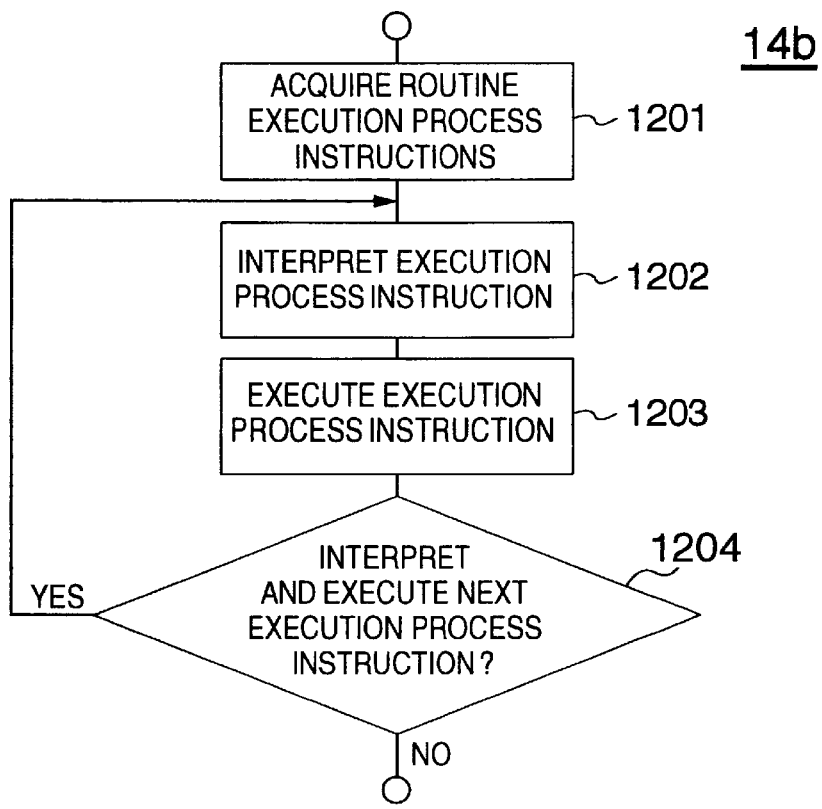
FIG. 12 is a flow chart illustrating a processing flow for a routine execution unit 14 on a divided data side shown in FIG. 2.

FIG. 12 is a flow chart illustrating a processing flow for the routine execution unit 14b for executing a routine containing no database operation statement in accordance with this embodiment.

As illustrated in FIG. 12, the routine execution unit 14b for executing a routine containing no database operation statement does not require an execution unit for a database operation statement, and acquires execution process instructions for a routine to be executed, in response to a request for execution of the routine (step 1201).

The routine execution process instructions are stored in the dictionary information storage unit 15 or can be acquired based on information in the dictionary information storage unit 15. If the routine execution unit 13b is provided with a cache for storing the routine execution process instructions, the routine execution unit 13a need not access the dictionary information storage unit 15 upon the second and subsequent routine calls.

There are a plurality of query execution units 23 on the divided data side for each divided data. When the routine execution units 14b on the divided data side individually access the dictionary information storage unit 15, the dictionary information storage unit 15 will suffer from an excessive load. Therefore, in an alternative, the query execution unit 24 on the front end side may only be allowed to access the dictionary information storage unit 15 so as to distribute a load on the dictionary information storage unit 15.

Next, the routine execution unit 14b sequentially interprets the routine execution process instructions (step 1202), and proceeds with the execution of the routine in accordance with corresponding execution process instructions (step 1203).

Figure 13:
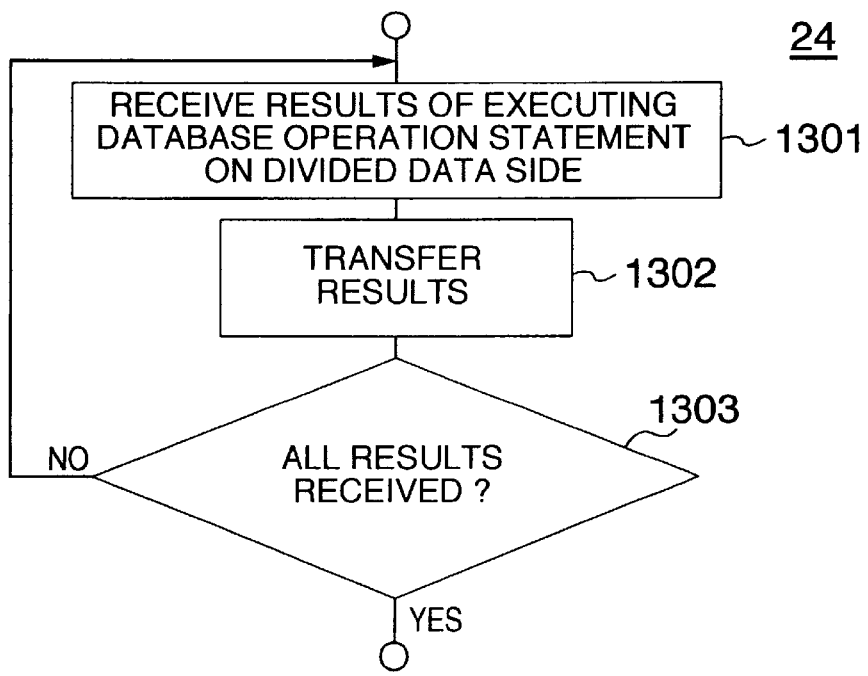
FIG. 13 is a flow chart illustrating a processing flow for a database operation statement execution unit 24 on a front end side shown in FIG. 2.

FIG. 13 is a flow chart illustrating a processing flow for the database operation statement execution unit 24 on the front end side in accordance with this embodiment.

As illustrated in FIG. 13, the database operation statement execution unit 24 on the front end side sequentially receives results from the database operation statement execution units 25 on the divided data side (step 1301).

Next, the database operation statement execution unit 24 transfers the results to a location where the database operation statement is used, such as a user application program, a routine body or the like, in the received order (step 1302). Subsequently, the database operation statement execution unit 24 totalizes the results until a termination report is sent from the respective database operation statement execution units 25 on the divided data side (step 1303).

While in the example illustrated in FIG. 13, the database operation statement execution unit 24 merely transfers the results from the respective database operation statement execution units 25 on the divided data side in the received order, the parallel database system routine executing method of this embodiment is also applicable, without any problem, to an alternative in which processing for sorting the received results, processing for performing any operations on the received results, and so on are provided on the front end side.

Figure 14:
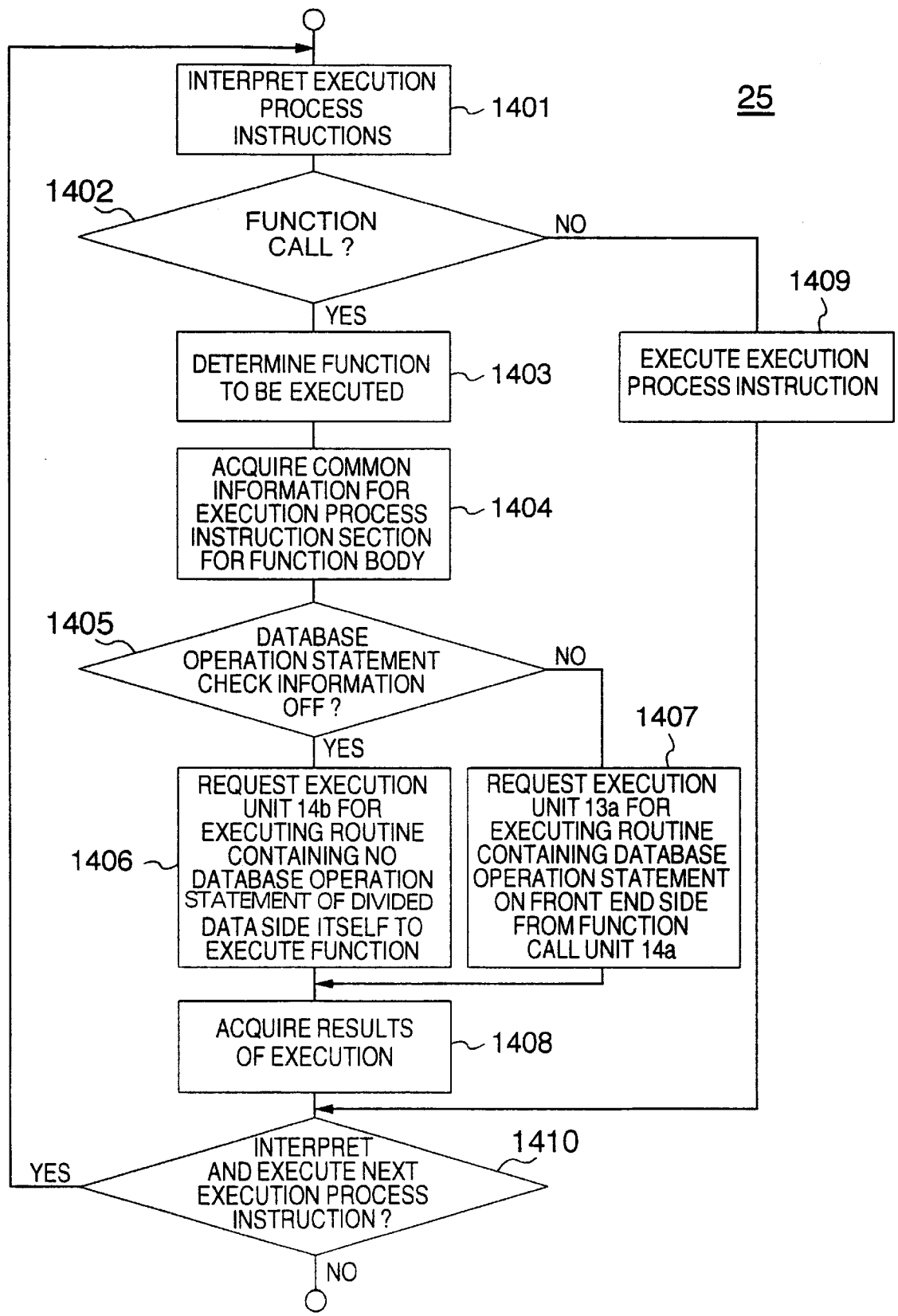
FIG. 14 is a flow chart illustrating a processing flow for a database operation statement execution unit 24 on the divided data side shown in FIG. 2.

FIG. 14 is a flow chart illustrating a processing flow for each database operation statement execution unit 25 on the divided data side in accordance with this embodiment.

As illustrated in FIG. 14, the database operation statement execution unit 25 on the divided data side sequentially interprets execution process instructions for a database operation statement (step 1401), and executes the same. When a function call is found (step 1402), the database operation statement execution unit 25 uniquely determines a function execution process instruction set 103 corresponding to the function call (step 1403).

In this example, it is assumed that a function execution process instruction set 103 corresponding to a function call is not uniquely determined when a query is analyzed. With SQL3, for which the standardization is now in progress, it is possible that the function execution process instruction set 103 corresponding to a function call is not uniquely determined when a query is analyzed. If a function execution process instruction set 103 corresponding to a function call is uniquely determined when a query is analyzed, this processing (step 1403) is not required.

Next, the database operation statement execution unit 25 acquires common information 54 for an execution process instruction section 51 for a function body of the determined function (step 1404), and checks whether or not a database operation statement is contained in the function body (step 1405).

The common information 54 is stored in the dictionary information storage unit 15 or can be acquired based on information in the dictionary information storage unit 15. If a cache is provided for storing the common information 54 and the function execution process instruction set 103, the common information 54 may be acquired from the cache.

When database operation statement check information 104 is set OFF, this means that the determined function does not contain a database operation statement in the body, so that the database operation statement execution unit 25 requests the routine execution unit 14b for executing a routine containing no database operation statement, in its own, to execute the function (step 1406).

Conversely, when database operation statement check information 104 is set ON, this means that the determined function contains a database operation statement in the body, so that the database operation statement execution unit 25 requests the routine execution unit 13a for executing a routine containing a database operation statement on the front end side, through the function call unit 14a, to execute this function (step 1407).

Then, the function execution process instruction set 103 is executed in the routine execution unit 13a on the front end side or in the routine execution unit 14b on the divided data side, and the database operation statement execution unit 25 acquires the results of the execution (step 1408) for use in later processing and so on.

When no function call is found (step 1402), the database operation statement execution unit 25 proceeds with the execution in accordance with the corresponding execution process instruction (step 1409). Subsequently, the database operation statement execution unit 25 interprets and executes the execution process instructions in sequence (step 1410).

While in the example illustrated in FIG. 14, the database operation statement check information 104 is retrieved from the common information 54, the database operation statement check information 104 may be provided in any suitable manner, as long as it is ensured to retrieve the database operation statement check information 104 which has been set during analysis of a function definition statement. For example, the database operation statement check information 104 may be transferred together when a query execution process instruction on the divided data side is transferred from the front end side to the divided data side.

In addition, the database operation statement check information 104 may be of any form, instead of flag information to be set ON or OFF, as long as it provides identification as to whether or not a database definition statement is included in the routine body.

Figure 15:
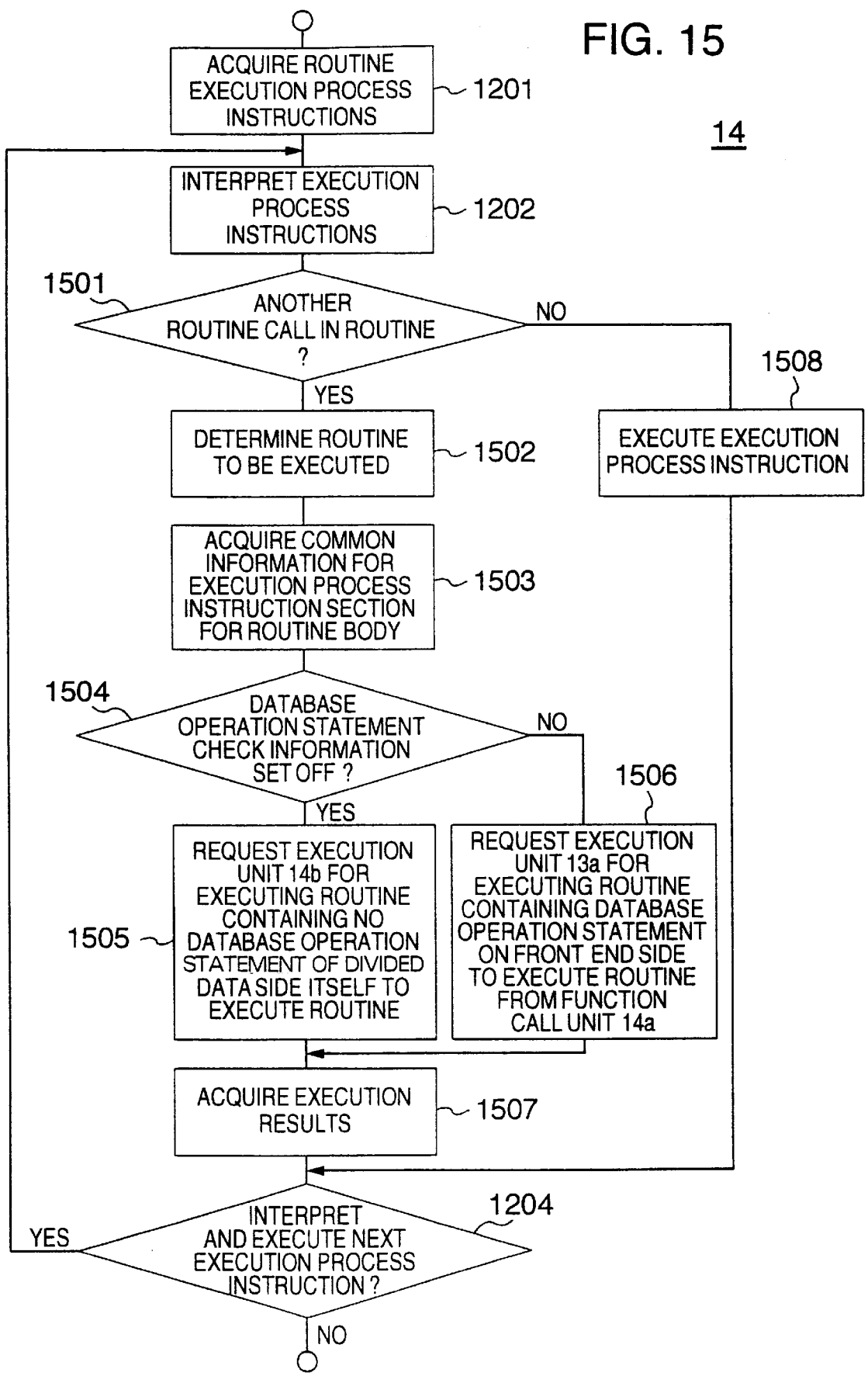
FIG. 15 is a flow chart illustrating in greater detail the processing flow for the routine execution unit 14b on the divided data side shown in FIG. 2.

FIG. 15 is a flow chart illustrating a processing flow for the routine execution unit 14b for executing a routine containing no database operation statement, when executing execution process instructions in accordance with this embodiment.

As illustrated in FIG. 15, the flow for the execution of an execution process instructions by the routine execution unit 14b for executing a routine containing no database operation statement describes the execution of execution process instructions at step 1203 illustrated in FIG. 12 in greater detail. While FIG. 14 describes a function call on the divided data side, FIG. 15 shows that the present invention can also be applied to a procedure or a function which is further called from a function executed on the divided data side.

In response to a request for executing a routine, the routine execution unit 14b acquires execution process instructions for a routine to be executed (step 1201). Then, the routine execution unit 14b sequentially interprets the routine execution process instructions (step 1202), and executes the same.

When another routine call is found in the routine (step 1501), a routine (procedure or function) execution process instruction is uniquely determined for the routine call (step 1502). Next, common information 54 is acquired for an execution process instruction section 51 for function body of the determined routine (step 1503), and checks whether or not a database operation statement is contained in the body (step 1504).

If database operation statement check information 104 is set OFF, this means that the routine does not contain a database operation statement in its body, so that a request for executing the routine is issued to the routine execution unit 14b for executing a routine containing no database operation statement (step 1505).

Conversely, if the database operation statement check information 104 is set ON, this means that the routine contains a database operation statement in its body, so that a request for executing a routine is issued from the function call unit 14a to the routine execution unit 13a for executing a routine containing a database operation statement (step 1506).

Then, the routine execution process instruction is executed in the routine execution unit 13a on the front end side or in the routine execution unit 14b on the divided data side. The results of the execution are acquired (step 1507) for use in later processing and so on.

If no routine call is found (step 1501), the execution is advanced in accordance with the corresponding execution process instruction (step 1508). Subsequently, the execution process instruction is interpreted in sequence for execution (step 1204).

Figure 16:
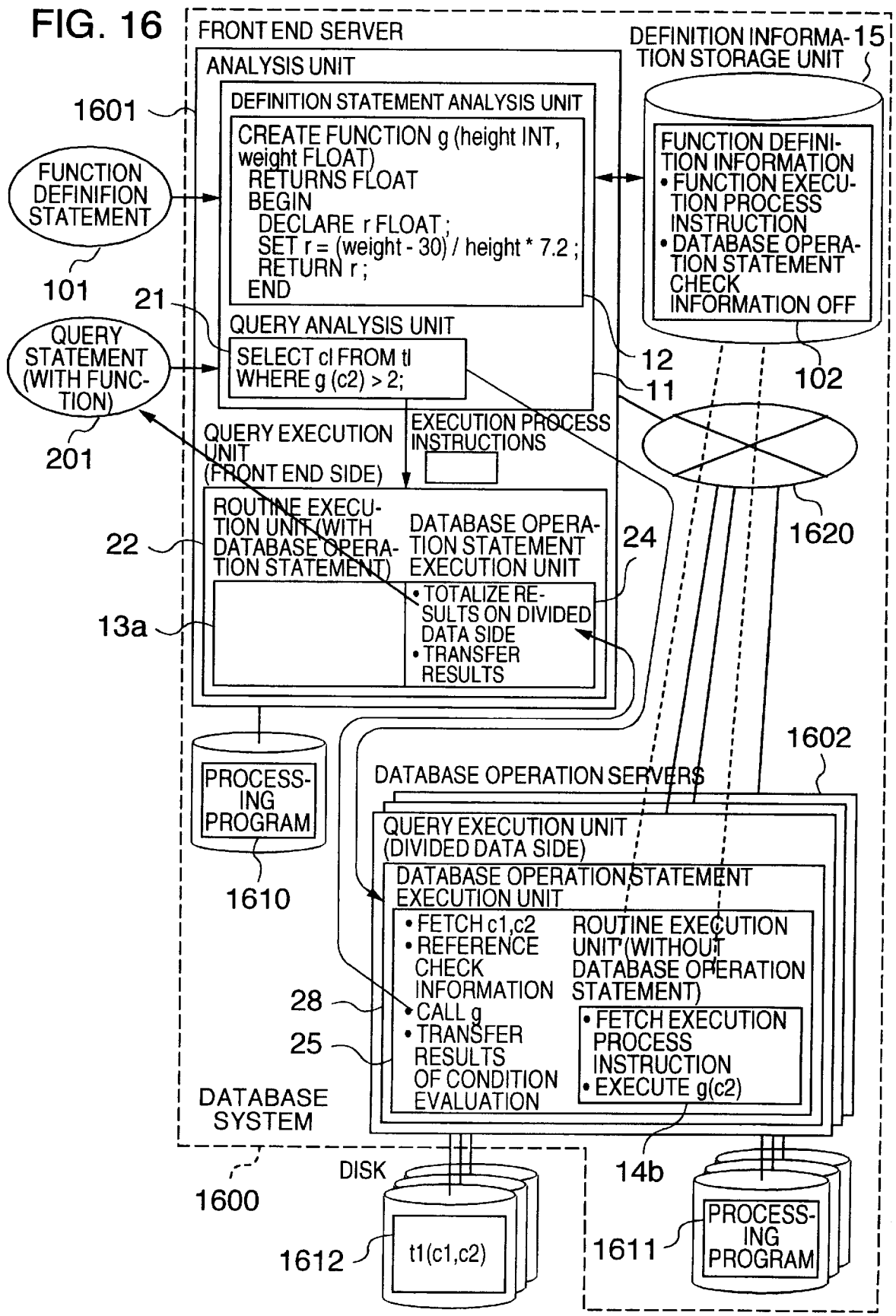
FIG. 16 is a block diagram generally illustrating the configuration of a parallel database system which is another embodiment of the present invention.

FIG. 16 generally illustrates the configuration of a parallel database system 1600 according to another embodiment of the present invention.

Referring specifically to FIG. 16, the parallel database system 1600 comprises a front end server 1601 which is a server for analyzing and compiling a query 201 for a database from a user application program (hereinafter abbreviated as "UAP"); and a plurality of database operation servers 1602, each of which is a server for accessing a disk device 1612, which stores data, to perform operations on the data.

The front end server 1601 and the database operation servers 1602 are interconnected through a high speed interconnection network 1620. It should be noted, however, that instead of the parallel database system having a plurality of processors interconnected through the network 1620, the present invention may also be applied to a single processor system, as illustrated in FIG. 2, if the system is assigned with parallel processes as functions of a plurality of servers, in order to reduce the number of times of communications between the processes.

In connection with the relationship between processors and disks and memories in the database operation servers 1602, the present invention is applicable to any configuration which implies communications between a function calling party and a function executing party for executing functions containing search and update-related queries in its body, irrespective of whether the configuration is a share-nothing type in which processors do not share a disk, a shared-disk type in which a plurality of processors share a disk, or any other shared type.

In FIG. 16, description is made on a configuration which comprises a single UAP, the single front end server 1601 and a plurality of the database operation servers 1602 for simplicity. However, a plurality of front end servers 1601 can handle a plurality of queries from a single or a plurality of UAPs.

Again, the present invention is applicable to the latter case without any problem since it can be regarded that the system is configured of a single UAP, the single front end server 1601 and a plurality of database operation servers 1602 for each query.

Definition information required for compilation exists as a dictionary information storage unit 15 which is accessible from the front end server 1601. A separate server for providing the dictionary information storage unit 15 may be provided (this server is referred to as the "dictionary server").

In the parallel database system illustrated in FIG. 16, the front end server 1601 has an analysis unit 11 and a query execution unit 22 on the front end side, while the database operation servers 1602 have query execution units 23 on the divided data side.

Since function calls on the divided data side are present in the database operation servers 1602, and a routine execution unit 13 for executing a routine containing a database operation statement is present in the front end server 1601, the number of times of communications between the front end server 1601 and the database operation servers 1602, incurred by each function call, will amount to a large value, so that the present invention can be effectively applied to this configuration.

When a parallel database configuration includes a server dedicated to perform a special function such as sort, the present invention is similarly applicable to this configuration, by providing a routine execution unit 14b for a routine including no processing for a database operation statement for a function call or the like from a query execution unit 23 of the server.

The present invention is also applicable to a parallel database configuration which includes a plurality of servers having both functions of the front end server 1601 and the database operation server 1602 in FIG. 16 (hereinafter referred to as a "multi-function server")

Assume that the multi-function servers are interconnected through a high speed interconnection network 1620. It should be noted however that instead of the parallel database system having a plurality of processors interconnected through a network, the present invention may also be applied to a single processor system, if the system is assigned with parallel processes as functions of a plurality of servers, in order to reduce the number of times of communications between the processes.

The present invention is further applicable to any configuration other than the parallel database configuration illustrated in FIG. 16, as long as the configuration comprises components corresponding to those in FIG. 2.

A specific example is applied to the parallel database system illustrated in FIG. 16. A function a does not contain a database operation statement in its body, so that database operation statement check information 104 associated therewith is set OFF.

A query including a call g(c2) to the function g is analyzed to create an execution process instruction which is executed by a database operation statement execution unit 24 and a database operation statement execution unit 25 of the front end server 1601 and each database operation server 1602 respectively.

Each database operation server 1602 sequentially fetches column data c1, c2 of a table t1 from a disk and intends to execute the function call g(c2).

Since the database operation statement check information 104 associated with the function g to be executed is set OFF, the function g is executed in a routine execution unit 14b in the database operation server 1602, and no communication between the front end server 1601 and each database operation server 1602 is incurred each time the function g is executed.

Each database operation server 1602 evaluates data for conditions from the result of the execution of the function call g(c2), and transfers data satisfying the conditions to the front end server 1601. The front end server 1601 totalizes the results from each database operation server 1602, and transfers the totalized results to a UAP query originating party.

The processing of the flow chart described above is executed as processing programs 210–212 in the parallel database system illustrated in FIG. 2 as an example. However, the programs are not limited to those stored in an external storage device physically connected directly to a computer system as is the case of the example in FIG. 2. Alternatively, the programs may be stored in any storage medium such as a hard disk drive, a floppy disk drive, or the like which can be read and written by a computer.

Figure 17:
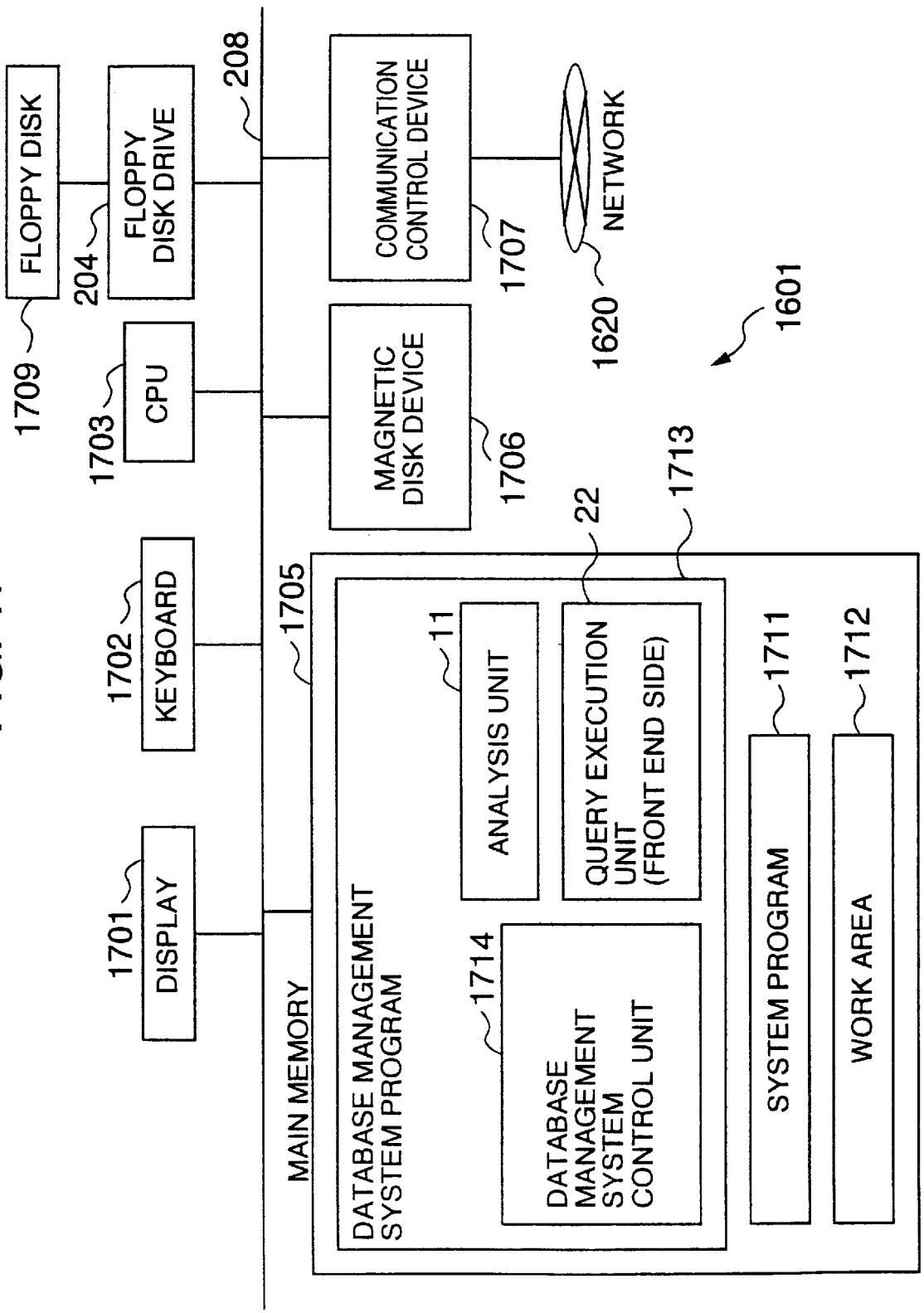
FIG. 17 is a block diagram generally illustrating the configuration of a front end server in the embodiment of FIG. 16.
Figure 18:
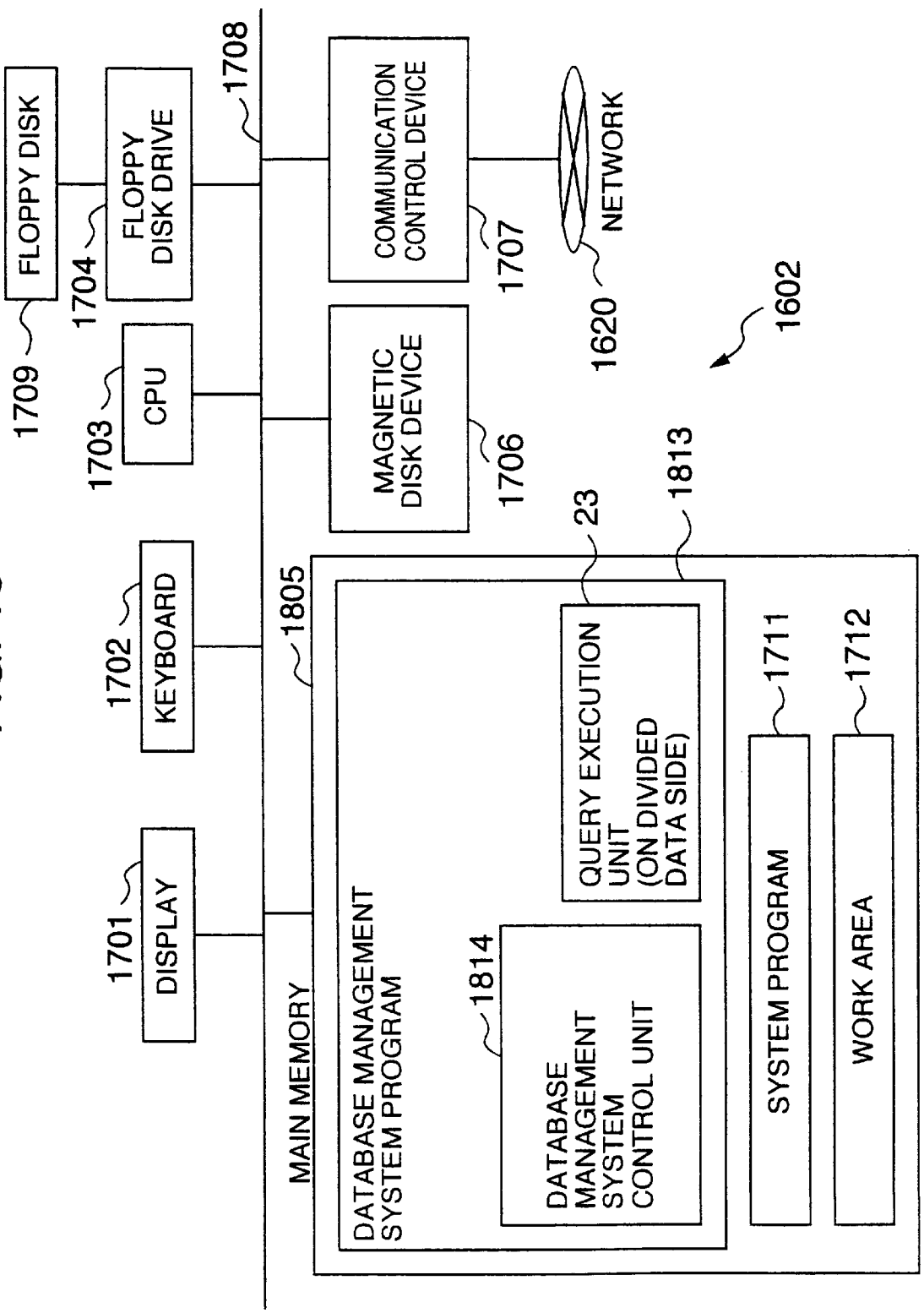
FIG. 18 is a block diagram generally illustrating the configuration of each database operation server in the embodiment of FIG. 16.

FIGS. 17, 18 illustrate the configurations of the front end server 1601 and the database operation server 1602 shown in FIG. 16, respectively. Specifically, FIGS. 17, 18 illustrate an example in which the analysis unit 11, the query execution unit (front end side) 22, the query execution unit (divided data side) 23 and so on in FIG. 16 are allocated on a general computer system. The front end server 1601 of FIG. 17 and the database operation server 1602 of FIG. 18 are interconnected through a network 1620.

Referring specifically to FIG. 17, the front end server 1601 may be implemented by a general computer system including a display 1701, a keyboard 1702, a central processing unit (CPU) 1703, a floppy disk drive 1704, a main memory 1705, a magnetic disk device 1706 and a communication control device 1707. No special purpose hardware units are required exclusively for applying the present invention. The display 1701 is used to display the execution status of a database management system (program) and so on. The keyboard 1702 is used to input a command for instructing execution and so on of the database management system. The central processing unit 1703 executes a variety of programs composing the database management system including a program for executing the present invention. The floppy disk drive 1704 is used to write and read data on and from a floppy disk 1709.

The main memory 1705 is used to hold a variety of programs including the program for executing the present invention as well as temporary data associated with the execution of programs. The magnetic disk device 1706 is used to store a database (table data), temporary data produced during the operation of a query to the database, and so on. The communication control device 1707 is used for communications through the network 1620 for performing exchange or the like of requests and data with other database servers having a similar configuration in the parallel database management system. A system bus 1708 is used to interconnect a variety of devices as mentioned above.

The main memory 1705 holds a system program 1711, a work area 1712, a database management system control program 1714 and so on. The system program 1711 provides basic functions for executing a variety of programs constituting the database management system including the program for executing the present invention. The work area 1712 is used to store data which may be temporarily required when a program is executed. A dictionary information storage unit 15 for function definition information 102 and so on may reside on a magnetic disk drive or in a work area.

The database management system program 1713 analyzes a query to a database, creates query execution process instructions, and executes the query based on the query execution process instructions. The database management system program 1713 also has a program (portion) having functions of analyzing a variety of definition statements such as table definition, function definition and so on to register the analysis results in the work area or on the magnetic disk drive as dictionary information, and so on, in addition to the functions mentioned above. The database management system program 1713 has a definition statement analysis program (portion) 11, a query analysis program (portion) 21 and a query execution unit 22, functions of which are controlled by a control program (portion) 1714. It should be noted that while in FIG. 17, the query analysis program, the query execution unit, and the definition statement analysis program are clearly separated such that the control program 1714 controls their functions, programs commonly executable for the respective functions may exist, or the respective functions or programs may exist in combination without the intervention of the control unit, as long as the programs as a whole are capable of analyzing and executing a query for a search in a database.

Definition statements such as a function definition statement 101 and a query statement 201 are stored in the work area 1712 or the like through the bus 1708, and analyzed in the analysis unit 11. Alternatively, the present invention is applicable, without any problem, to a configuration where an analysis program for a user application program including definition statements and query statements, resident in a main memory in the front end server 1701, analyzes a user application program from the floppy disk 1709 to pass definition statements and query statements to the database management system program 1713.

The database operation server 1602 illustrated in FIG. 18 may also be implemented by a general computer system including a display 1701, a keyboard 1702, a central processing unit (CPU) 1703, a floppy disk drive 1704, a main memory 1705, a magnetic disk device 1706 and a communication control device 1707. In FIG. 18, elements designated by the same reference numerals as those in FIG. 17 have the same or similar functions. The main memory 1805 stores a database management system program 1813 for the database operation server. The program 1813 has a query execution unit 23, the function of which is controlled by a control program 1814.

If the analysis unit 11, the query execution unit 22 on the front end side, and the query execution unit 23 on the divided data side are stored in the main memory, the database system 100 illustrated in FIG. 1 and 2 can be configured by a system architecture having a single CPU as illustrated in one of FIGS. 17 and 18.

The programs shown in FIGS. 17 and 18 are set in the main memories from the floppy disk 1709 or through the network 1602. While in this embodiment, the floppy disk 1709 is used to communicate programs and data with the outside, any other type of portable media such as a magneto-optical disk, a write-once optical disk and so on may also be used for this purpose.

While the present invention has been specifically described in connection with several embodiments thereof, it goes without saying that the present invention is not limited to the specific embodiments described above, and that various modifications can be made without departing from the spirit of the present invention.

What is claimed is:

1. A routine executing method in a parallel database system, comprising the steps of:

analyzing, by a definition statement analyzing unit of said database system, a definition statement of a routine related to database processing, to create a program of execution process instructions of said routine, store said execution process instructions in an information storage unit, decide whether or not said routine contains a database operation statement, and store a result of the decision thus made in said information storage unit as check information;

analyzing, by a query statement analyzing unit of said database system, a query statement related to database processing, to create a first program of execution process instructions of said query to be executed on a front end side of said database system and a second program of execution process instructions of said query to be executed on a divided data side of said database system; and executing said routine by a routine execution unit on said divided data side based on said check information, when there is a call of said routine in said second program and a database operation statement is not contained in said routine.

2. A routine executing method according to claim 1, further comprising the steps of:

analyzing a definition statement of a routine used in said query statement in said query analysis unit to determine whether or not a database operation statement is contained in said routine, and store a determination result in an information storage unit as check information; and determining a routine containing no database operation statement in said second query execution process instruction program, based on said check information, in said step of executing on said divided data side.

3. A routine executing method according to claim 2, further comprising the steps of:

in said step of analyzing a definition statement of a routine, creating a routine execution process instruction program, with respect to said routine, and storing said routine execution process instruction program in said information storage unit; and in said step of executing on said divided data side, retrieving said routine execution process instruction program corresponding to said routine containing no database operation statement from said information storage unit and holding the same on said divided data side, when executing for the first time said routine containing no database operation statement in said second query execution process instruction program, and executing said routine containing no database operation statement using said held routine execution process instruction program in second and subsequent execution of said routine containing no database operation statement.

4. A routine executing method according to claim 1, wherein said divided data side requests said front end side to execute a routine containing a database operation statement in said second query execution process instruction program.

5. A routine executing method according to claim 4, wherein when a routine is further nested in said routine containing no database operation statement in said second query execution process instruction program, said nested routine is executed in said routine execution unit on said divided data side if said nested routine does not contain a database operation statement; and execution of said nested routine is requested from said divided data side to said front end side if said nested routine contains a database operation statement.

6. A routine executing method according to claim 5, wherein said routine containing no database operation statement in said second query execution process instruction program is a function, and said nested routine is a function or a procedure.

7. A parallel database system comprising:

a front end side including a definition statement analysis unit and a query statement analysis unit;

a plurality of divided data sides connected to said front end side for distributively processing divided data in said database system, each said divided data side including a routine execution unit; and an information storage unit connected to said front end side;

wherein said definition statement analysis unit analyzes a definition statement of a routine related to database processing to create a routine execution process instruction program, storing said routine execution process instruction program in said information storage unit, and determining whether or not a database operation statement is contained in said routine to store a determination result in said information storage unit as check information;

said query statement analysis unit analyzes a query statement related to database processing to create a first query execution process instruction program to be executed on said front end side, and a second query execution process instruction program to be executed on each said divided data side;

said front end side requests each said divided data side to execute said second query execution process instruction program; and said routine execution unit executes a routine containing no database operation statement in said second query execution process instruction program based on said check information.

8. A parallel database system according to claim 7, wherein each said divided data side retrieves said routine execution process instruction program corresponding to said routine containing no database operation statement from said information storage unit and holds the same on each said divided data side, when executing for the first time said routine containing no database operation statement in said second query execution process instruction program, and executes said routine containing no database operation statement using said held routine execution process instruction program in second and subsequent execution of said routine containing no database operation statement.

9. A parallel database system according to claim 7, wherein each said divided data side comprises a routine call unit for requesting from each said divided data side to said front end side to execute a routine containing a database operation statement in said second query execution process instruction program.

10. A parallel database system according to claim 9, wherein when a routine is further nested in said routine containing no database operation statement in said second query execution process instruction program, said routine execution unit on each said divided data side executes said nested routine if said nested routine does not contain a database operation statement; and said routine call unit requests from each said divided data side to said front end side to execute said nested routine if said nested routine contains a database operation statement.

11. A parallel database system comprising:

a front end server including a definition statement analysis unit and a query statement analysis unit;

a plurality of database operation servers for distributively processing divided data in said database system, each of said database operation servers including a routine execution unit;

an information storage unit connected to said front end server; and a network for interconnecting said front end server and said plurality of database operation servers, wherein said definition statement analysis unit analyzes a definition statement of a routine related to database processing to create a routine execution process instruction program, storing said routine execution process instruction program in said information storage unit, and determining whether or not a database operation statement is contained in said routine to store a determination result in said information storage unit as check information;

said query statement analysis unit analyzes a query statement related to database processing to create a first query execution process instruction program to be executed in said front end server, and a second query execution process instruction program to be executed in each said database operation server;

said front end side requests each said database operation servers to execute said second query execution process instruction program through said network; and said routine execution unit executes a routine containing no database operation statement in said second query execution process instruction program based on said check information.

12. A parallel database system according to claim 11, wherein each said database operation servers retrieves said routine execution process instruction program corresponding to said routine containing no database operation statement from said information storage unit and holds the same on each said database operation servers, when executing for the first time said routine containing no database operation statement in said second query execution process instruction program, and executes said routine containing no database operation statement using said held routine execution process instruction program in second and subsequent execution of said routine containing no database operation statement.

13. A parallel database system according to claim 11, wherein each said database operation server further includes a routine call unit for requesting from each said database operation servers to said front end server to execute a routine containing a database operation statement in said second query execution process instruction program.

14. A parallel database system according to claim 13, wherein when a routine is further nested in said routine containing no database operation statement in said second query execution process instruction program, said routine execution unit in each said database operation server executes said nested routine if said nested routine does not contain a database operation statement; and said routine call unit requests from each said database operation servers to said front end server to execute said nested routine if said nested routine contains a database operation statement.

15. A parallel database system according to claim 11, wherein said information storage unit is connected to a dictionary server connected to said front end server through said network.

16. A front end server in a parallel database system comprising:

a definition statement analysis unit; and a query statement analysis unit, wherein:

said front end server is connected to an information storage unit and also connected to a network connected to a plurality of database operation servers for distributively processing divided data in said database system;

said definition statement analysis unit analyzes a definition statement of a routine related to database processing to create a routine execution process instruction program, storing said routine execution process instruction program in said information storage unit, and determining whether or not a database operation statement is contained in said routine to store a determination result in said information storage unit as check information;

said query statement analysis unit analyzes a query statement related to database processing to create a first query execution process instruction program to be executed in said front end server, and a second query execution process instruction program to be executed in said database operation servers; and said front end side server requests said database operation servers to execute said second query execution process instruction program through said network to have a routine execution unit of each said database operation servers execute a routine containing no database operation statement in said second query execution process instruction program based on said check information and said routine execution process instruction program.

17. A plurality of database operation servers for distributively processing divided data in a parallel database system wherein:

each said database operation servers includes a routine execution unit;

each said database operation servers is connected to a front end server through a network, said front end server including a definition statement analysis unit and a query statement analysis unit, and connected to an information storage unit; and each said database operation servers receives a request for execution of a query execution process instruction program to be executed in each said database operation servers through said network, said query execution process instruction program being created by said query statement analysis unit analyzing a query statement related to database processing, said routine execution unit of each said database operation servers executes a routine containing no database operation statement in said query execution process instruction program based on a routine execution process instruction program to be executed in each said database operation servers and check information which is a result of determining whether or not a database operation statement is contained in said routine.

18. A storage medium executable by a computer in a parallel database system, comprising:

a processing portion for analyzing by a definition statement analyzing unit of said database system, a definition statement of a routine related to database processing, to create a program of execution process instructions of said routine, store said execution process instructions in an information storage unit, decide whether or not said routine contains a database operation statement, and store a result of the decision thus made in said information storage unit as check information;

a processing portion for analyzing, by a query statement analyzing unit of said database system, a query statement related to database processing, to create a first program of execution process instructions of said query to be executed on a front end side of said database system and a second program of execution process instructions of said query to be executed on a divided data side of said database system; and a processing portion for executing said routine by a routine execution unit on said divided data side based on said check information, when there is a call of said routine in said second program and a database operation statement is not contained in said routine.

19. A parallel database system routine executing method for executing a routine in a parallel database system having a query execution unit on a divided data side for executing a query to divided data, and a query execution unit on a front end side for totalizing results of executing a query to each divided data and returning the totalized result, said query execution unit on the divided data side having a routine execution unit for executing a routine including no processing for a database operation statement, said parallel database system routine executing method comprising the steps of:

determining whether or not a database operation statement is contained in a body of a routine, and recording information indicative of said determination; and referencing said recorded information for a routine called by said query execution unit on the divided data side, selecting said routine execution units for executing a routine containing no database operation statement, located on said divided data side, when said routine does not contain a database operation statement, and selecting a routine execution unit for executing a routine including processing for a database operation statement, located on said front end side, when said routine contains a database operation statement, and executing said routine in said selected routine execution unit.

20. A parallel database system routine executing method according to claim 19, further comprising the step of referencing said information indicating whether or not a database operation statement is contained in a body of a routine upon execution to select a routine execution unit for executing said routine.

21. A parallel database system routine executing method according to claim 20, further comprising the step of referencing information indicating whether or not a database operation statement is contained in a body of another routine called by said routine to select a routine execution unit for executing said routine.

22. A parallel database system routine executing method according to claim 19, further comprising the step of referencing information indicating whether or not a database operation statement is contained in a body of another routine called by said routine to select a routine execution unit for executing said routine.

23. A medium having a program recorded thereon for causing a computer to function as a parallel database system having a query execution unit on a divided data side for executing a query to divided data, and a query execution unit on a front end side for totalizing results of executing a query to each divided data and returning the totalized result, said query execution unit on the divided data side having a routine execution unit for executing routine including no processing for a database operation statement, said program comprising:

a process for determining whether or not a database operation statement is contained in a body of a routine, and recording information indicative of said determination; and a process for referencing said recorded information for a routine called by said query execution unit on the divided data side, selecting said routine execution units for executing a routine containing no database operation statement, located on the routine calling side and said divided data side, when said routine does not contain a database operation statement, and selecting a routine execution unit for executing a routine including processing for a database operation statement, located on said front end side, when said routine contains a database operation statement, and executing said routine in said selected routine execution unit.

24. A medium according to claim 23 having a program recorded thereon for causing a computer to execute a process for referencing said information indicating whether or not a database operation statement is contained in a body of a routine upon execution to select a routine execution unit for executing said routine.

25. A medium according to claim 24 having a program recorded thereon for causing a computer to execute a process for referencing information indicating whether or not a database operation statement is contained in a body of another routine called by said routine to select a routine execution unit for executing said routine.

26. A medium according to claim 23 having a program recorded thereon for causing a computer to execute a process for referencing information indicating whether or not a database operation statement is contained in a body of another routine called by said routine to select a routine execution unit for executing said routine.

27. A storage medium executable by a computer in a parallel database system, comprising:

a processing portion for analyzing, by a definition statement analyzing unit of said database system, a definition statement of a routine related to database processing, to create a routine execution process instruction program, store said routine execution process instruction program in an information storage unit, and determine whether or not a database operation statement is contained in said routine to store a determination result in said information storage unit as check information;

a processing portion for analyzing, by a query statement analysis unit of said database system, a query statement related to database processing, to create a first query execution process instruction program to be executed on a front end side of said database system and a second query execution process instruction program to be executed on each of a plurality of divided data sides of said database system;

a processing portion for requesting, by said front end side, each said divided data side to execute said second query execution process instruction program; and a processing portion for executing, by a routine execution unit, a routine containing no database operation statement in said second query execution process instruction program based on said check information.

28. A storage medium according to claim 27, wherein each said divided data side retrieves said routine execution process instruction program corresponding to said routine containing no database operation statement from said information storage unit and holds the same on each said divided data side, when executing for the first time said routine containing no database operation statement in said second query execution process instruction program, and executes said routine containing no database operation statement using said held routine execution process instruction program in second and subsequent execution of said routine containing no database operation statement.

29. A storage medium according to claim 28, wherein each said divided data side comprises a routine call unit for requesting from each said divided data side to said front end side to execute a routine containing a database operation statement in said second query execution process instruction program.

30. A storage medium according to claim 29, wherein when a routine is further nested in said routine containing no database operation statement in said second query execution process instruction program, said routine execution unit on each said divided data side executes said nested routine if said nested routine does not contain a database operation statement; and said routine call unit requests from each said divided data side to said front end side to execute said nested routine if said nested routine contains a database operation statement.

31. A storage medium executable by a computer in a parallel database system, comprising:

a processing portion for analyzing, by a definition statement analyzing unit of said database system, a definition statement of a routine related to database processing, to create a routine execution process instruction program in an information storage unit, and determining whether or not a database operation statement is contained in said routine to store a determination result, in said information storage unit as check information;

a processing portion for analyzing, by a query statement analysis unit, a query statement related to database processing to create a first query execution process instruction program to be executed in a front end server, and a second query execution process instruction program to be executed in each of a plurality of database operation servers, a processing portion for requesting, by said front end server, each said database operation server to execute said second query execution process instruction program through a network interconnecting said front end server and said plurality of database operation servers; and a processing portion for executing, by a routine execution unit, a routine containing no database operation statement in said second query execution process instruction program based on said check information.

32. A storage medium according to claim 31, wherein each said database operation server retrieves said routine execution process instruction program corresponding to said routine containing no database operation statement from said information storage unit and holds the same on each said database operation server, when executing for the first time said routine containing no database operation statement in said second query execution process instruction program, and executes said routine containing no database operation statement using said held routine execution process instruction program in second and subsequent executions of said routine containing no database operation statement.

33. A storage medium according to claim 31, wherein each said database operation server further includes a routine call unit for requesting from each said database operation server to said front end server to execute a routine containing a database operation statement in said second query execution process instruction program.

34. A storage medium according to claim 33, wherein when a routine is further nested in said routine containing no database operation statement, in said second query execution process instruction program, said routine execution unit in each said database operation server executes said nested routine if said nested routine does not contain a database operation statement; and said routine call unit requests from each said database operation servers to said front end server to execute said nested routine if said nested routine contains a database operation statement.

35. A storage medium according to claim 31, wherein said information storage unit is connected to a dictionary server connected to said front end server through said network.

36. A routine executing method in a parallel database system, comprising the steps of:

analyzing, by a definition statement analyzing unit of said database system, a definition statement of a routine related to database processing, to create a routine execution process instruction program, store said routine execution process instruction program in an information storage unit, and determine whether or not a database operation statement is contained in said routine to store a determination result in said information storage unit as check information;

analyzing, by a query statement analysis unit of said database system, a query statement related to database processing, to create a first query execution process instruction program to be executed on a front end side of said database system and a second query execution process instruction program to be executed on each of a plurality of divided data sides of said database system;

requesting, by said front end side, each said divided data side to execute said second query execution process instruction program; and executing, by a routine execution unit, a routine containing no database operation statement in said second query execution process instruction program based on said check information.

37. A routine executing method according to claim 36, wherein each said divided data side retrieves said routine execution process instruction program corresponding to said routine containing no database operation statement from said information storage unit and holds the same on each said divided data side, when executing for the first time said routine containing no database operation statement in said second query execution process instruction program, and executes said routine containing no database operation statement using said held routine execution process instruction program in second and subsequent execution of said routine containing no database operation statement.

38. A routine executing method according to claim 36, wherein each said divided data side comprises a routine call unit for requesting from each said divided data side to said front end side to execute a routine containing a database operation statement in said second query execution process instruction program.

39. A routine executing method according to claim 38, wherein when a routine is further nested in said routine containing no database operation statement in said second query execution process instruction program, said routine execution unit on each said divided data side executes said nested routine if said nested routine does not contain a database operation statement; and said routine call unit requests from each said divided data side to said front end side to execute said nested routine if said nested routine contains a database operation statement.

40. A routine executing method in a parallel database system, comprising the steps of:

analyzing, by a definition statement analyzing unit of said database system, a definition statement of a routine related to database processing to create a routine execution process instruction program in an information storage unit, and determining whether or not a database operation statement is contained in said routine to store a determination result in said information storage unit as check information;

analyzing, by a query statement analysis unit, a query statement related to database processing to create a first query execution process instruction program to be executed in a front end server, and a second query execution process instruction program to be executed in each of a plurality of database operation servers;

requesting, by said front end server, each said database operation server to execute said second query execution process instruction program through a network interconnecting said front end server and said plurality of database operation servers; and executing, by a routine execution unit, a routine containing no database operation statement in said second query execution process instruction program based on said check information.

41. A routine executing method according to claim 40, wherein each said database operation server retrieves said routine execution process instruction program corresponding to said routine containing no database operation statement from said information storage unit and holds the same on each said database operation server, when executing for the first time said routine containing no database operation statement in said second query execution process instruction program, and executes said routine containing no database operation statement using said held routine execution process instruction program in second and subsequent executions of said routine containing no database operation statement.

42. A routine executing method according to claim 40, wherein each said database operation server further includes a routine call unit for requesting from each said database operation server to said front end server to execute a routine containing a database operation statement in said second query execution process instruction program.

43. A routine executing method according to claim 42, wherein when a routine is further nested in said routine containing no database operation statement in said second query execution process instruction program, said routine execution unit in each said database operation server executes said nested routine if said nested routine does not contain a database operation statement; and said routine call unit requests from each said database operation servers to said front end server to execute said nested routine if said nested routine contains a database operation statement.

44. A routine executing method according to claim 40, wherein said information storage unit is connected to a dictionary server connected to said front end server through said network.

\* \* \* \* \*